United States Patent
Borwig et al.

(10) Patent No.: US 8,499,604 B2
(45) Date of Patent: Aug. 6, 2013

(54) DUCT MAKING APPARATUS AND METHOD

(75) Inventors: Michael C. Borwig, Swisher, IA (US); John R. Welty, Walford, IA (US)

(73) Assignee: Mestek Machinery, Inc., Westfield, MA (US)

( * ) Notice: Subject to any disclaimer, the term of this patent is extended or adjusted under 35 U.S.C. 154(b) by 782 days.

(21) Appl. No.: 12/536,789

(22) Filed: Aug. 6, 2009

(65) Prior Publication Data
US 2010/0077821 A1 Apr. 1, 2010

Related U.S. Application Data

(63) Continuation-in-part of application No. 12/243,489, filed on Oct. 1, 2008, now Pat. No. 8,276,425.

(51) Int. Cl.
*B21D 11/00* (2006.01)

(52) U.S. Cl.
USPC ........ 72/306; 72/51; 72/307; 72/177; 72/179; 29/521

(58) Field of Classification Search
USPC .......... 72/319, 320, 322, 323, 312, 313, 72/314, 308, 309, 306, 307, 310, 387, 177, 72/179, 51; 29/521
See application file for complete search history.

(56) References Cited

U.S. PATENT DOCUMENTS

| | | | |
|---|---|---|---|
| 417,813 A | 12/1889 | Davidson | |
| 2,039,886 A | 5/1936 | Cohn | |
| 2,076,228 A | 4/1937 | Dressing | |
| 2,370,702 A * | 3/1945 | Yoder | 72/12.8 |
| 2,522,097 A | 9/1950 | Cookson | |
| 2,802,487 A | 8/1957 | Breehl | |
| 4,368,052 A * | 1/1983 | Bitsky et al. | 493/96 |
| 4,397,062 A * | 8/1983 | Huang | 16/33 |
| 4,663,957 A | 5/1987 | Ishii et al. | |
| 5,105,640 A | 4/1992 | Moore | |
| 5,120,485 A * | 6/1992 | Johnson | 264/278 |
| 5,133,580 A | 7/1992 | Meinig | |
| 5,377,520 A | 1/1995 | Thoms et al. | |
| 5,868,988 A * | 2/1999 | Budnick | 264/296 |
| 5,996,644 A | 12/1999 | Iizuka | |
| 6,056,021 A | 5/2000 | Iizuka | |
| 6,640,600 B2 | 11/2003 | Meinert | |
| 6,676,000 B2 * | 1/2004 | Lang et al. | 227/51 |
| 6,814,106 B1 | 11/2004 | Iizuka | |
| 7,156,320 B2 * | 1/2007 | Wang et al. | 239/128 |
| 7,721,405 B2 * | 5/2010 | Lang et al. | 29/505 |
| 7,913,976 B2 * | 3/2011 | Gaunt | 254/11 |

(Continued)

FOREIGN PATENT DOCUMENTS

JP 2001001064 1/2001

*Primary Examiner* — Dana Ross
*Assistant Examiner* — Homer Boyer
(74) *Attorney, Agent, or Firm* — McCormick, Paulding & Huber LLP

(57) ABSTRACT

A duct making apparatus bends a metal web to form a duct blank having a lock tab at a forward end and having a Z-fold at a rearward end. Prior to shearing off the duct blank from the metal web, the apparatus bends the duct blank to insert the lock tab into the Z-fold, and further bends the Z-fold to form a clinch tab holding the lock tab into the Z-fold. After shearing off the duct blank from the metal web, the apparatus clinches the clinch tab over the lock tab to form a completed duct blank.

15 Claims, 32 Drawing Sheets

U.S. PATENT DOCUMENTS

| | | |
|---|---|---|
| 8,024,848 B2 * | 9/2011 | Carter .............................. 29/432 |
| 8,113,513 B2 * | 2/2012 | Funada ......................... 271/250 |
| 2002/0067950 A1 | 6/2002 | Price et al. |
| 2002/0094233 A1 | 7/2002 | Price et al. |
| 2004/0020500 A1 * | 2/2004 | Wrenn et al. ................. 131/194 |
| 2004/0050130 A1 | 3/2004 | Massee |
| 2004/0093924 A1 | 5/2004 | Toben et al. |
| 2004/0111988 A1 | 6/2004 | Toben et al. |
| 2005/0116470 A1 | 6/2005 | Duffy |
| 2006/0048835 A1 | 3/2006 | Yamamoto et al. |
| 2006/0108061 A1 * | 5/2006 | Winter et al. ................. 156/265 |
| 2009/0084152 A1 | 4/2009 | Borwig et al. |

* cited by examiner

DUCT MAKING APPARATUS AND METHOD

CROSS REFERENCE TO RELATED APPLICATIONS

This application is a continuation-in-part of, and claims priority to, U.S. patent application Ser. No. 12/243,489, filed on Oct. 1, 2008, hereby incorporated herein by reference in its entirety. This application also relates to subject matter disclosed in co-pending U.S. patent application Ser. No. 12/511,125, filed Jul. 29, 2009, of which relevant portions are hereby incorporated herein by reference.

FIELD OF THE INVENTION

The present invention relates generally to a duct making apparatus and, more particularly, to a duct making apparatus that forms and seals a lock seam to form a complete duct blank as part of an inline manufacturing process without intermediate manual handling, thereby providing an ease of manufacture.

BACKGROUND OF THE INVENTION

Ducts are extensively utilized in heating and ventilating systems to distribute heated or cooled air throughout a building structure. These ducts are commonly formed from differing gauges of sheet metal, or the like, in portions of predetermined lengths which are then connected to one another to form a continuous duct system for distributing air.

With known apparatus for manufacturing ducts for use in HVAC systems and the like, a series of bends are made in a metal web to form a duct blank. A seam is then pre-formed at an open corner of the duct blank by aligning and then bending free edges of the partially formed duct. Typically, the duct blank is then removed from the apparatus along the line of the seam, and the seam is closed manually to form a complete duct blank. Final closure of the pre-formed seam is accomplished manually to accommodate varying duct sizes and to accommodate the need for bracing of the duct blank during seam closure. However, during removal of the duct blank from the apparatus, the free edges in the pre-formed seam tend to separate, requiring the seam to be manually reformed prior to final closure. Thus, making ducts according to the known apparatus is inefficient at least because the free edges must be manually aligned, bent, and closed.

With the foregoing problems and concerns in mind, it is the general object of the present invention to provide an integrated apparatus for in-line manufacture of ducts.

SUMMARY OF THE INVENTION

In view of the above, it is a general object of the present invention to provide a duct making apparatus that pre-forms a seam as part of an inline manufacturing process to provide an ease of manufacture not present in known duct making systems.

It is another object of the present invention to form a duct blank having a finished lock seam, without intermediate manual handling of the duct blank.

In one embodiment, the present invention comprises a duct making apparatus that includes a lower platen, an upper platen, a table, a clamp beam, a leaf, and a controller directing the motions of the apparatus. The controller directs the motions of the apparatus so as to bend a metal web into the form of a duct blank comprising a lock seam. The leaf includes a clinching tool for holding the duct blank and clinching the lock seam after the duct blank is sheared away from the metal web.

These and other advantages of the present invention will be better understood in view of the Figures and preferred embodiment described.

DETAILED DESCRIPTION OF THE PREFERRED EMBODIMENT

Figure 1:
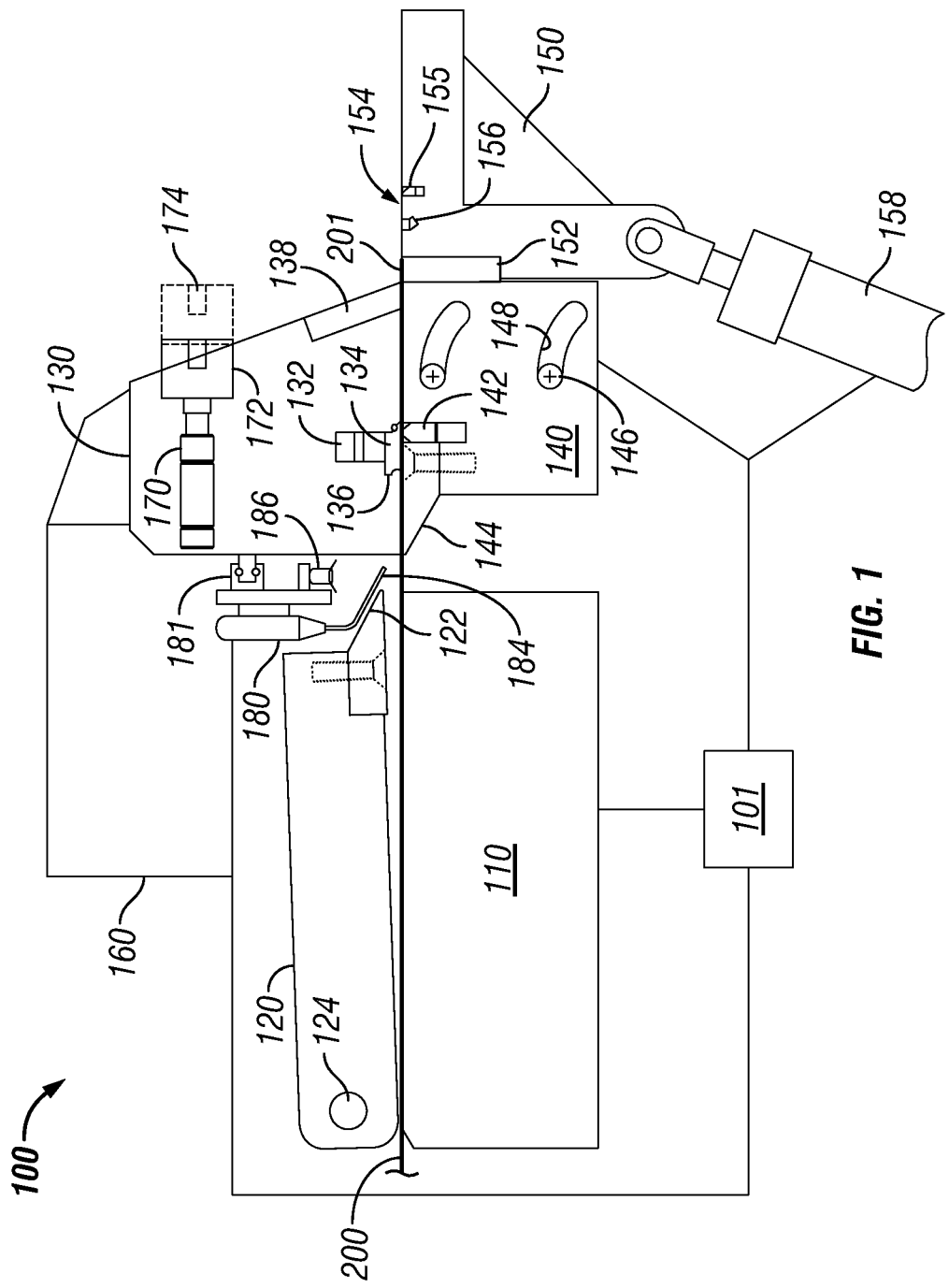
FIGS. 1-30 are schematic side views of a duct making apparatus in accordance with an embodiment of the present invention, wherein the apparatus is shown forming a section of duct.

Referring to FIGS. 1-33, the present invention is a duct making apparatus 100 used with a controller 101 for forming a closed duct blank 400 from a web stock such as a metal web 200. As part of a larger machine for inline manufacturing, shown in FIGS. 32 and 33, the controller 101 directs the apparatus 100 to bend the metal web 200 to form a complete duct blank 400 having a finished lock seam 300.

Throughout the following detailed description of drawings, the direction "forward" refers to a normal advancing motion of the metal web 200 from left to right in the drawings; the direction "rearward" refers to a retracting motion of the metal web 200 from right to left.

Figure 31:
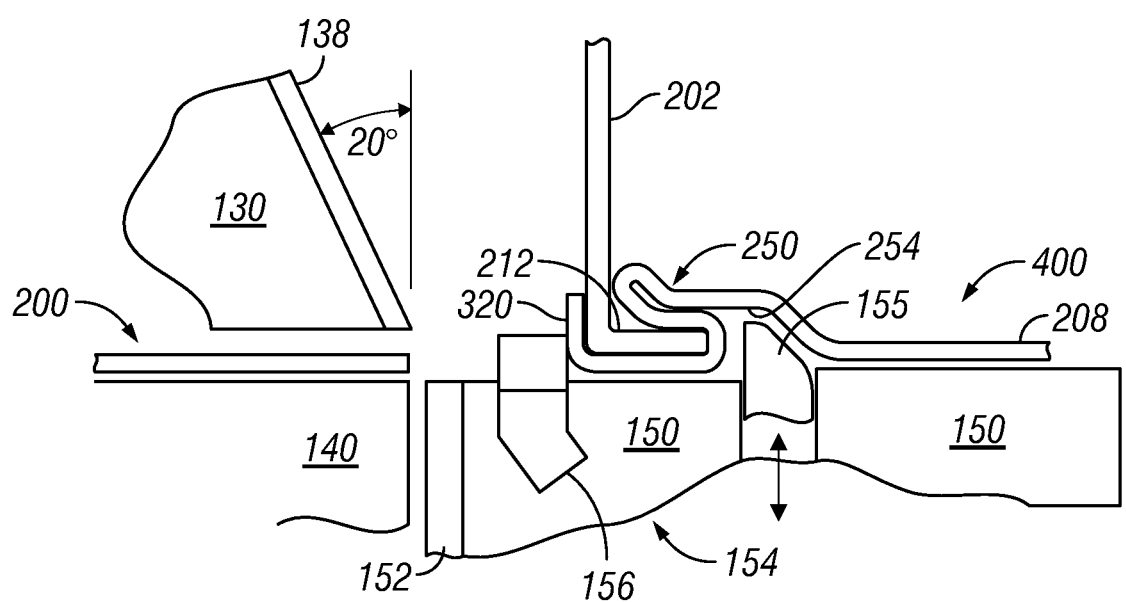
FIG. 31 is a detail side view of a leaf and a clinching tool in the apparatus of FIGS. 1-30.
Figure 32:
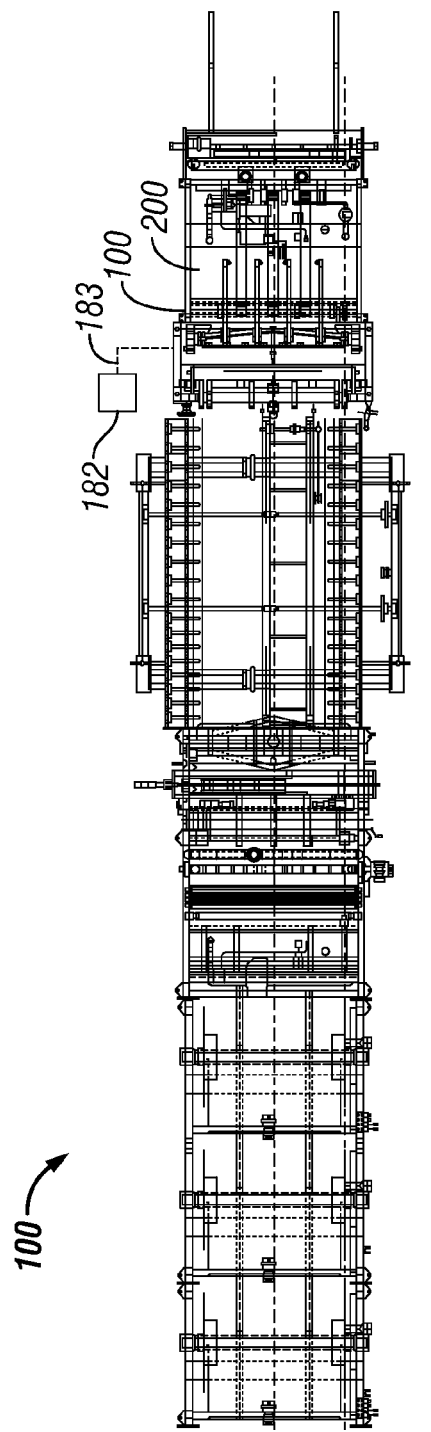
FIGS. 32 and 33 are plan and side views of the duct making apparatus of FIGS. 1-31, as incorporated into a larger machine.
Figure 33:
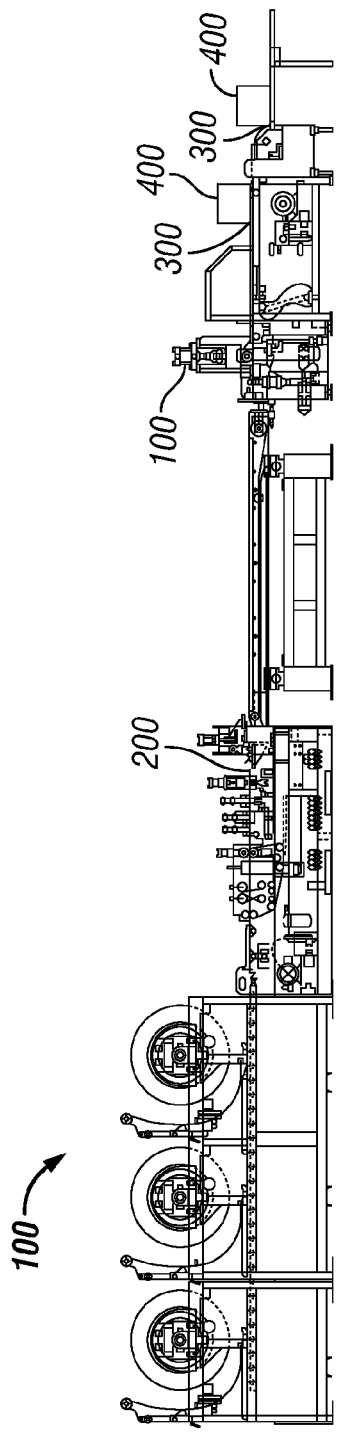

Referring to FIG. 1, the apparatus 100 includes a lower platen 110, an upper platen 120, a clamp beam 130, a table 140, a leaf 150, a subframe 160, a ram 170, and a sealant injector 180. The upper platen 120 is movably mounted to the apparatus 100. The clamp beam 130, the table 140, and the leaf 150 are mounted within the subframe 160 for individual motion relative to the subframe 160. The subframe 160 is movably mounted to the apparatus 100. The ram 170 and the sealant injector 180 are movably mounted to the clamp beam 130. The controller 101, also shown in FIG. 32 and 33, is configured to control the motions of the movable parts 120, 130, 140, 150, 160, 170, 180 so as to accomplish the processes described hereunder with reference to FIGS. 2-31.

Referring back to FIG. 1, the upper platen 120 includes a jaw 122 and pivots on an axle 124. The upper platen 120 is vertically movable between an open position, wherein the metal web 200 can slide across the lower platen 110, and a closed position firmly holding the metal web 200 against the lower platen 110.

The clamp beam 130 houses an upper insert 132 and includes a groove 134 extending across the lateral width of the clamp beam 130 opposite an upper surface of the table 140. The groove 134 includes a rearward pocket 136. The clamp beam 130 also includes a first shear blade 138. The upper insert 132 is vertically movable within the clamp beam 130 from an upwardly retracted position to a downwardly extended position where the upper insert 132 extends into the groove 134. The clamp beam 130 is vertically movable toward and away from the table 140 so as to clamp and release the metal web 200.

The table 140 houses a lower insert 142, and also includes a beak 144. The lower insert 142 is disposed in horizontal alignment with the groove 134 and is vertically movable relative to the table 140 between a retracted position where the lower insert 142 is entirely housed within the table 140 and a fully extended position where the lower insert 142 protrudes above the table into the groove 134. The lower insert 142 preferably extends across the lateral width of the table 140. Alternatively, the lower insert 142 can be laterally movable across the width of the table 140.

The leaf 150 includes a second shear blade 152 opposed to the first shear blade 138 of the clamp beam 130. The leaf 150 also includes a clinching tool 154. Referring specifically to FIG. 31, the clinching tool 154 includes a retractable rib 155 extending across the width of the leaf 150, and also includes a retractable roller assembly 156 disposed between the retractable rib 155 and the second shear blade 152. The retractable roller assembly 156 is movable across the leaf 150 along the retractable rib 155.

Referring back to FIG. 1, the clamp beam 130, the table 140, and the leaf 150 are mounted to the subframe 160, which is movably connected to the rest of the apparatus 100 for motion along the pathway generally illustrated by pivot pins 146 and pivot slots 148. The clamp beam 130 is vertically movable relative to the subframe 160, toward and away from the table 140. The leaf 150 is pivotally and vertically movable relative to the subframe 160 by operation of the leaf ram 158.

The ram 170 is mounted to the clamp beam 130. Preferably, to avoid interference with the sealant injector 180, the ram 170 is housed within an upper portion of the clamp beam 130. A gripper 172 is mounted to the ram 170 for forward and rearward motion relative to the clamp beam 130. In the embodiment shown in FIG. 1, the gripper 172 includes an electromagnet 174 that can be activated to hold an adjacent segment of the metal web 200. In embodiments for working with non-magnetic webstock 200, the gripper 172 can include a vacuum port or other non-magnetic means for adsorption or adhesion to a segment of the web 200.

Referring also to FIG. 32, the sealant injector 180 is mounted for motion along a powered slide 181 disposed on the rearward face of the clamp beam 130. The powered slide 181 defines an injection path orthogonal to the forward motion of the metal web 200, and is arranged so as not to interfere with operation of the ram 170. In one embodiment, the sealant injector 180 is in fluid communication with a pneumatically powered ram pump 182, such as an Ingersoll Ram Pump, via a flexible hose 183. Preferably, the ram pump 182 is not mounted directly to the movable sealant injector 180, but is disposed on a fixed mount alongside the apparatus 100. The flexible hose 183 is of sufficient length to extend from the ram pump 182 across the full transit of the powered slide 181. The sealant injector 180 also includes a sealant nozzle 184 and an optical sensor 186. In one embodiment, the sealant nozzle 184 is a pneumatically controlled needle type nozzle that can be actuated by the controller 101, or directly by the optical sensor 186.

As shown in FIG. 1, each cycle of the inline manufacturing process begins with the upper platen 120 raised away from the lower platen 110. The metal web 200 is fed forward between the closely separated clamp beam 130 and table 140 until a forward free edge of the metal web 200 protrudes beyond the first shear blade 138 to form a short segment 201 that rests against an upper face of the leaf 150. The clamp beam 130 then secures the metal web 200 to the table 140.

FIGS. 2-30 show the apparatus 100 in use, as part of the larger machine shown in FIGS. 32-33, for forming the duct blank 400. Throughout the operations of FIGS. 2-20 and 22-30, the sealant injector 180 is retracted to an end of the powered slide 181 so as to avoid interference with motions of the upper platen 120, the clamp beam 130, the ram 170, or the metal web 200. Accordingly, the sealant injector 180 is not shown in these figures. FIG. 21 illustrates the sealant injector 180 in motion along the powered slide 181 to place a cold sealant bead 187 in the Z-fold 250.

Figure 2:
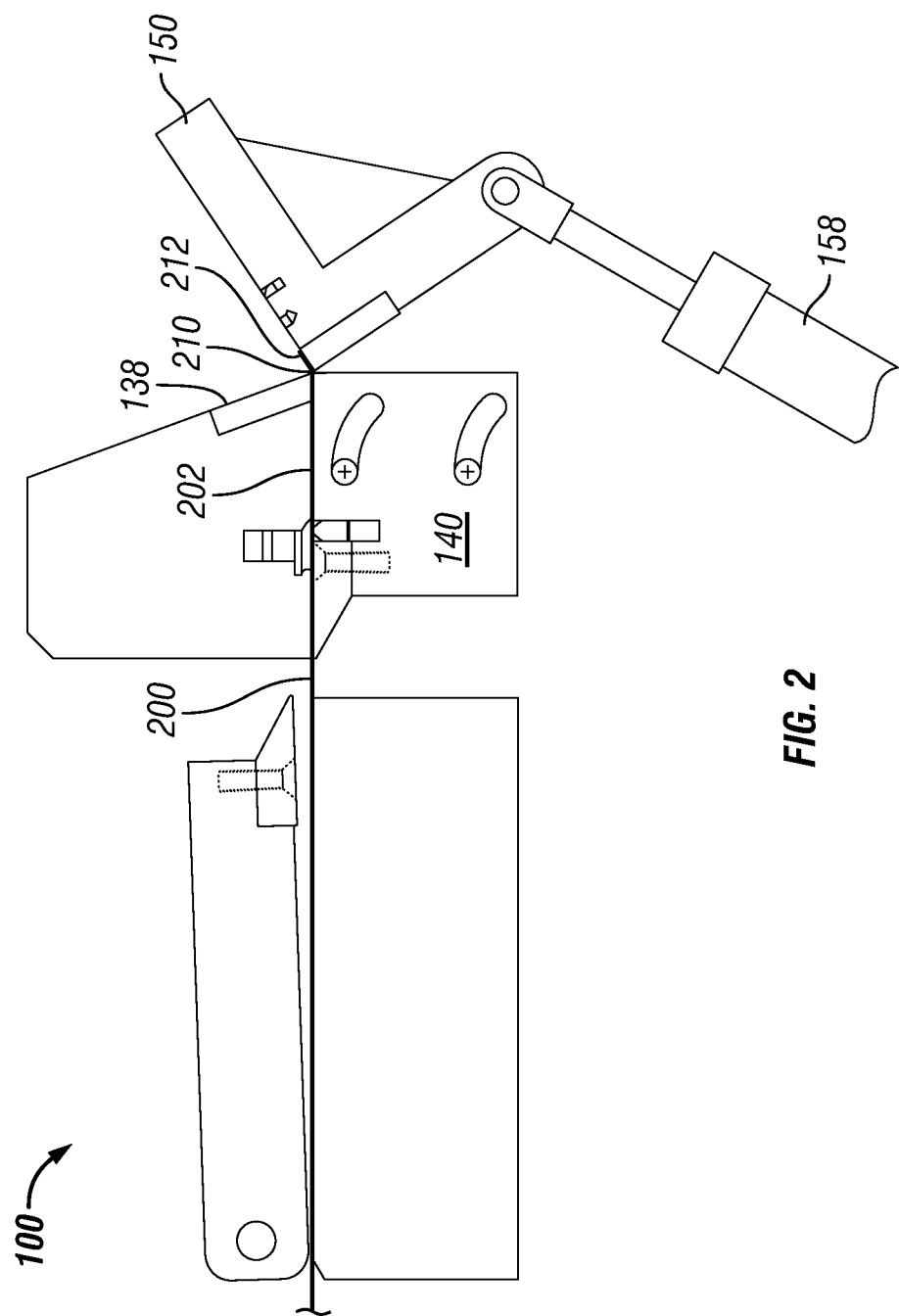
Figure 3:
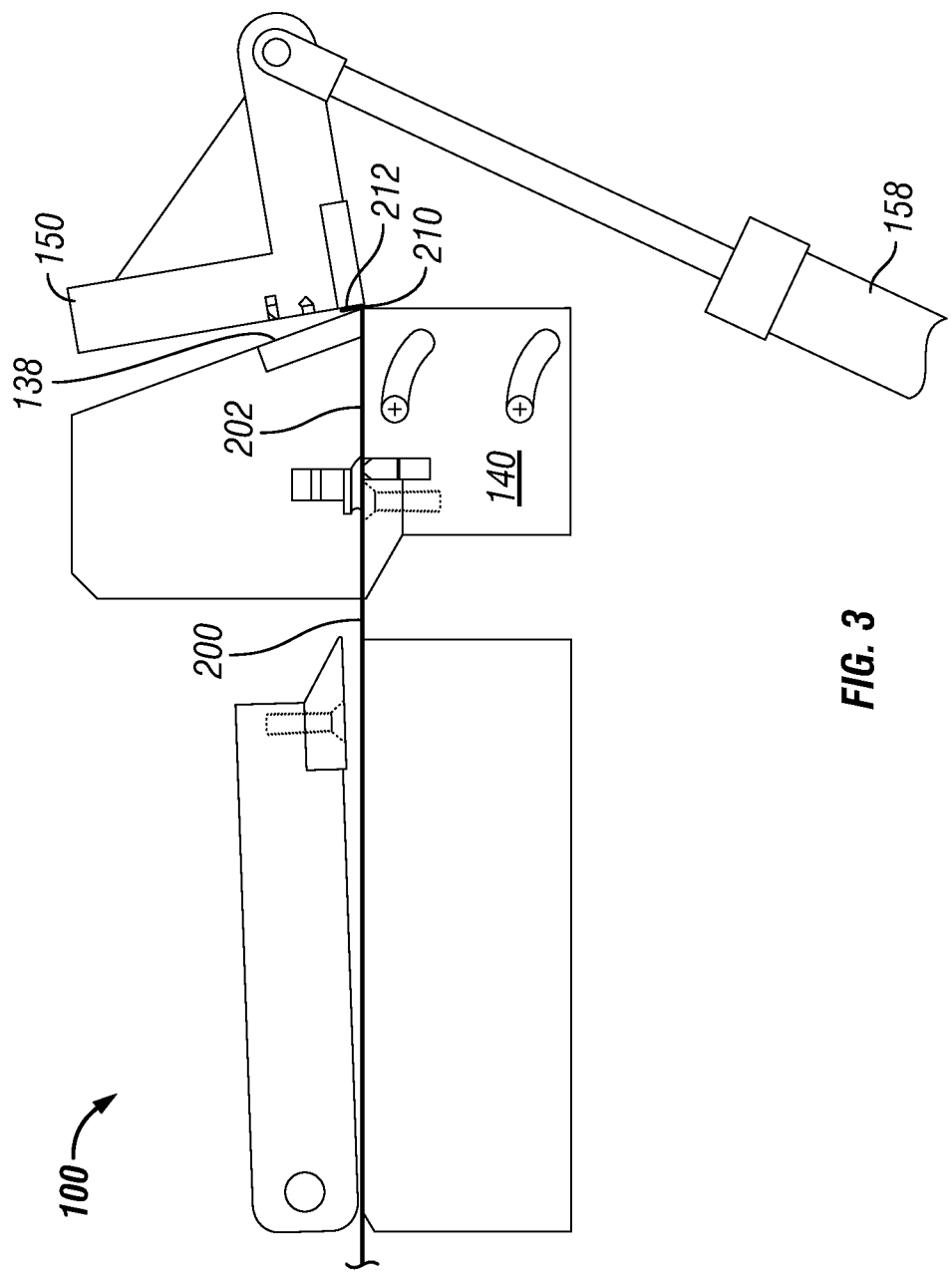

As shown in FIGS. 2-3, the leaf ram 158 is extended to pivot the leaf 150 toward the clamp beam 130, thereby bending the metal web 200 against the first shear blade 138 to form a bend 210 separating the short segment 201 from a first segment 202. When bent perpendicular to the first segment 202, the short segment 201 becomes a lock tab 212.

Figure 4:
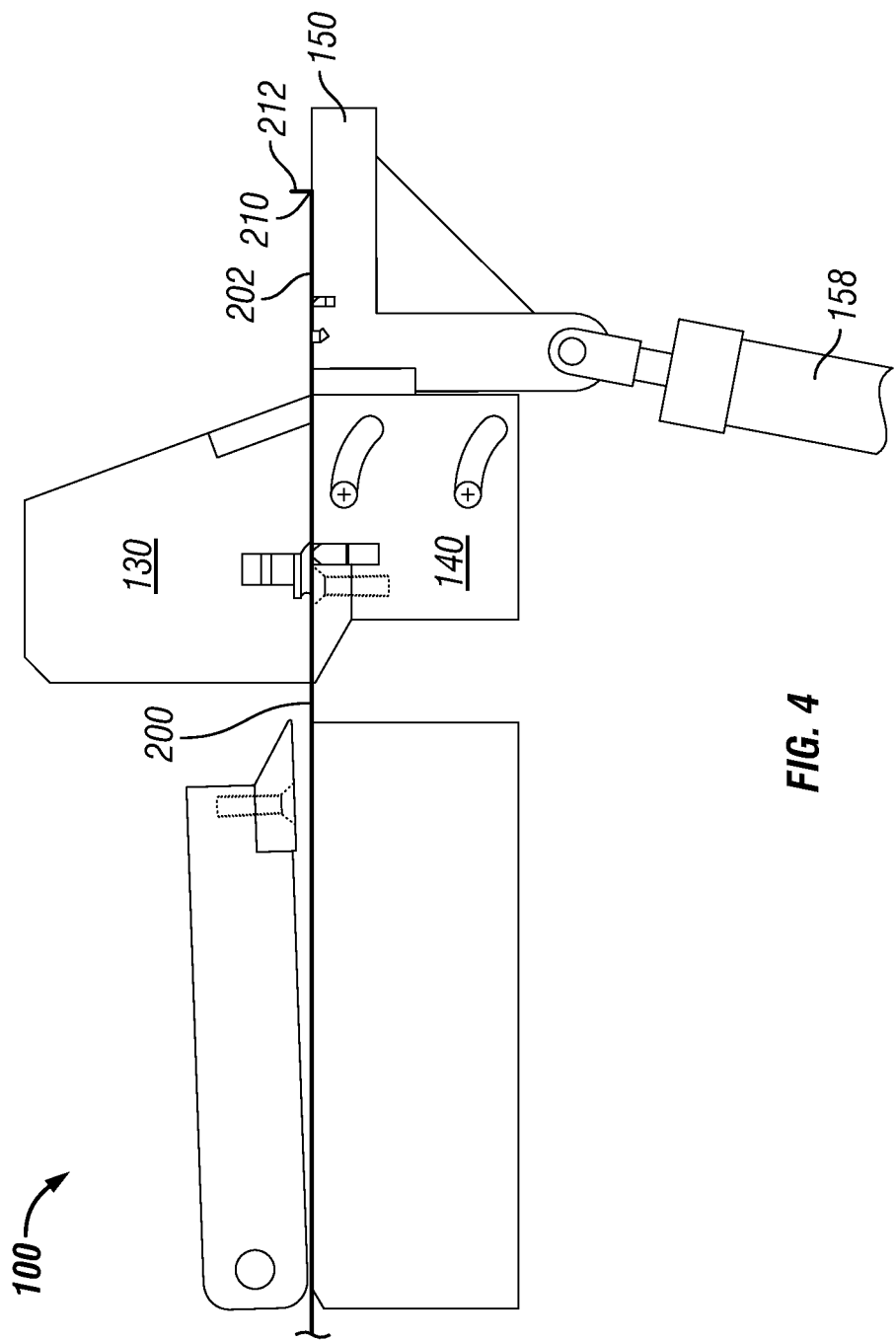

After forming the lock tab 212, the leaf ram 158 retracts to return the leaf 150 to an in-line position for further forward feeding of the metal web 200. The clamp beam 130 also is raised slightly away from the table 140 and the metal web 200 is advanced as shown in FIG. 4.

Figure 5:
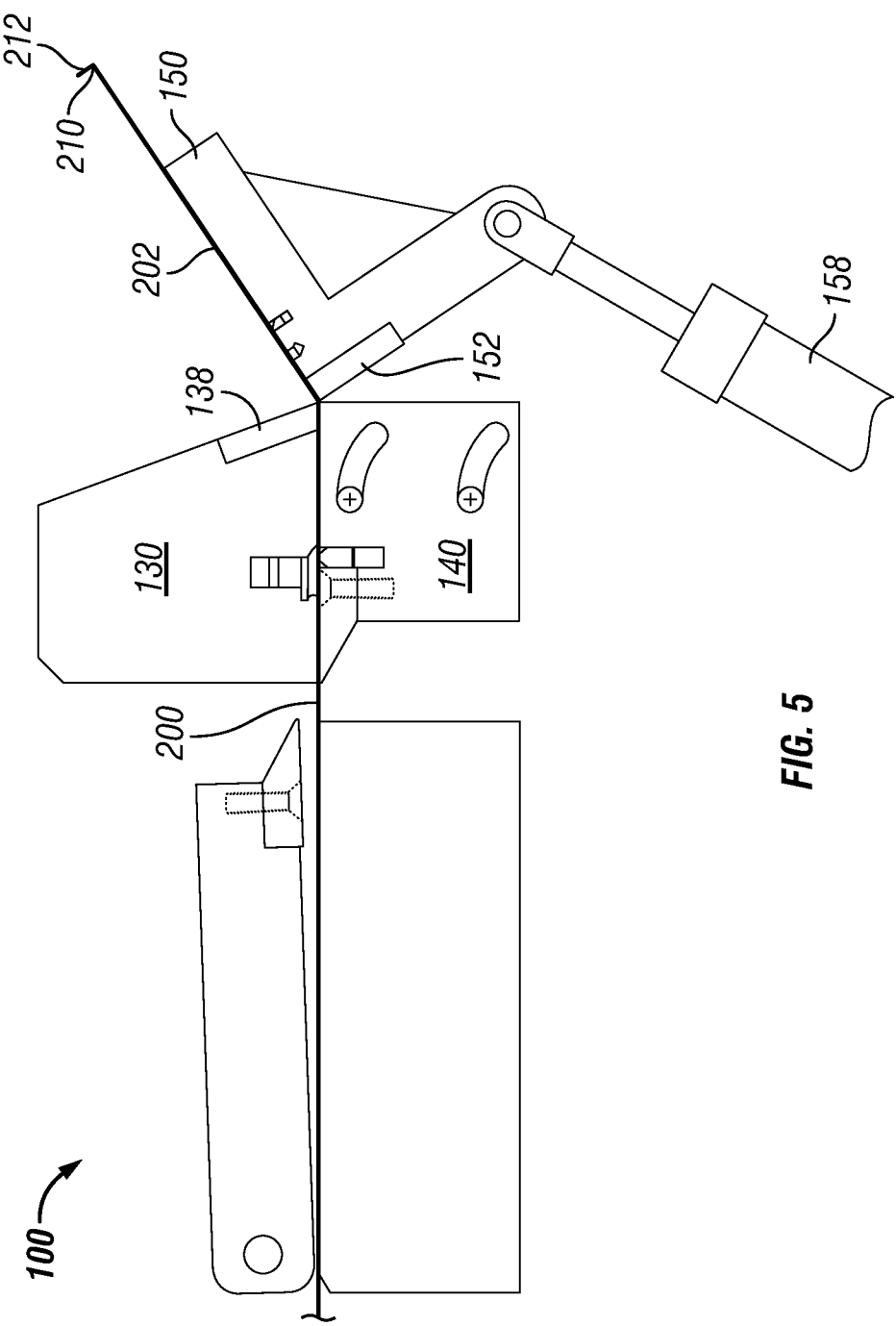
Figure 6:
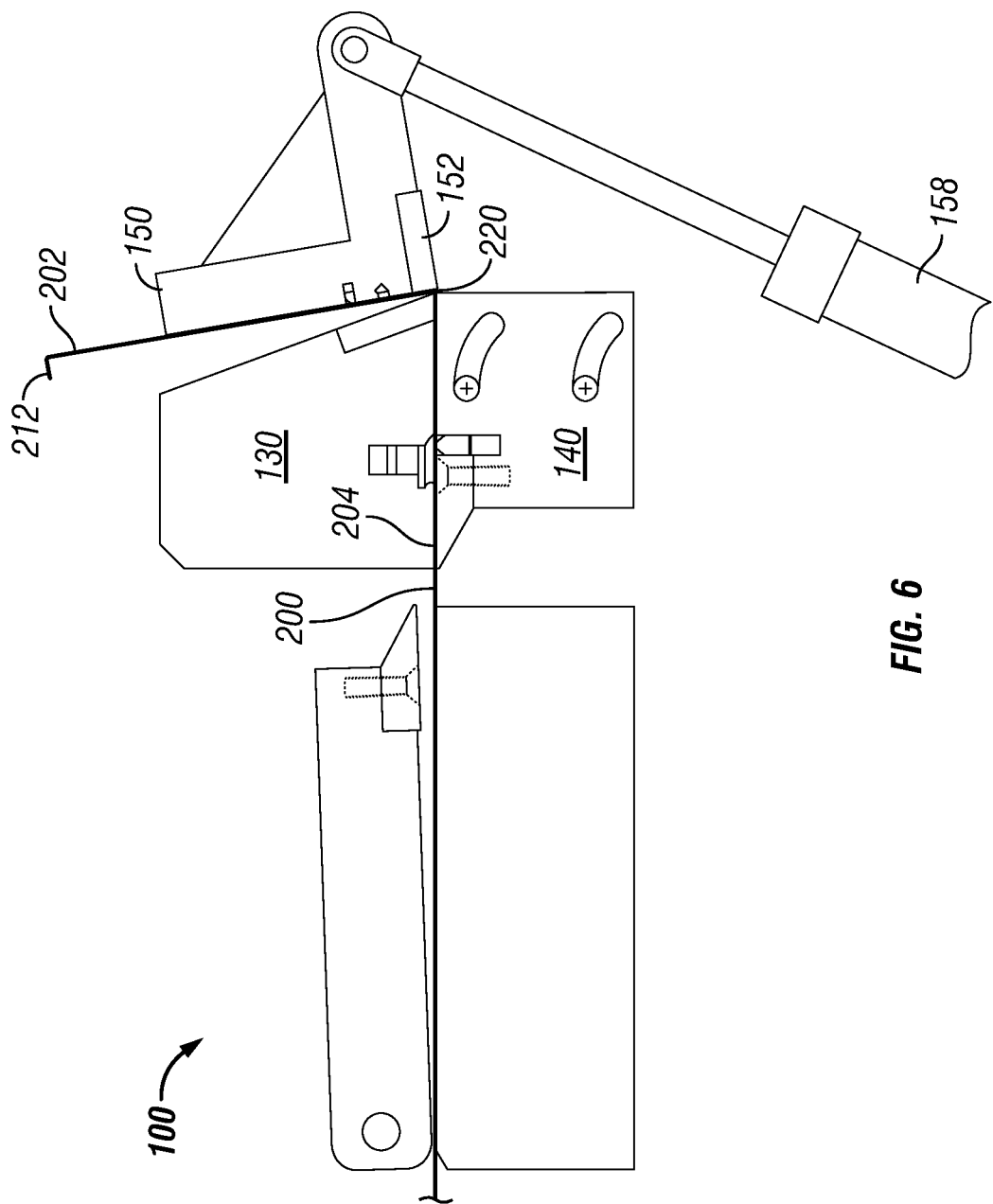
Figure 7:
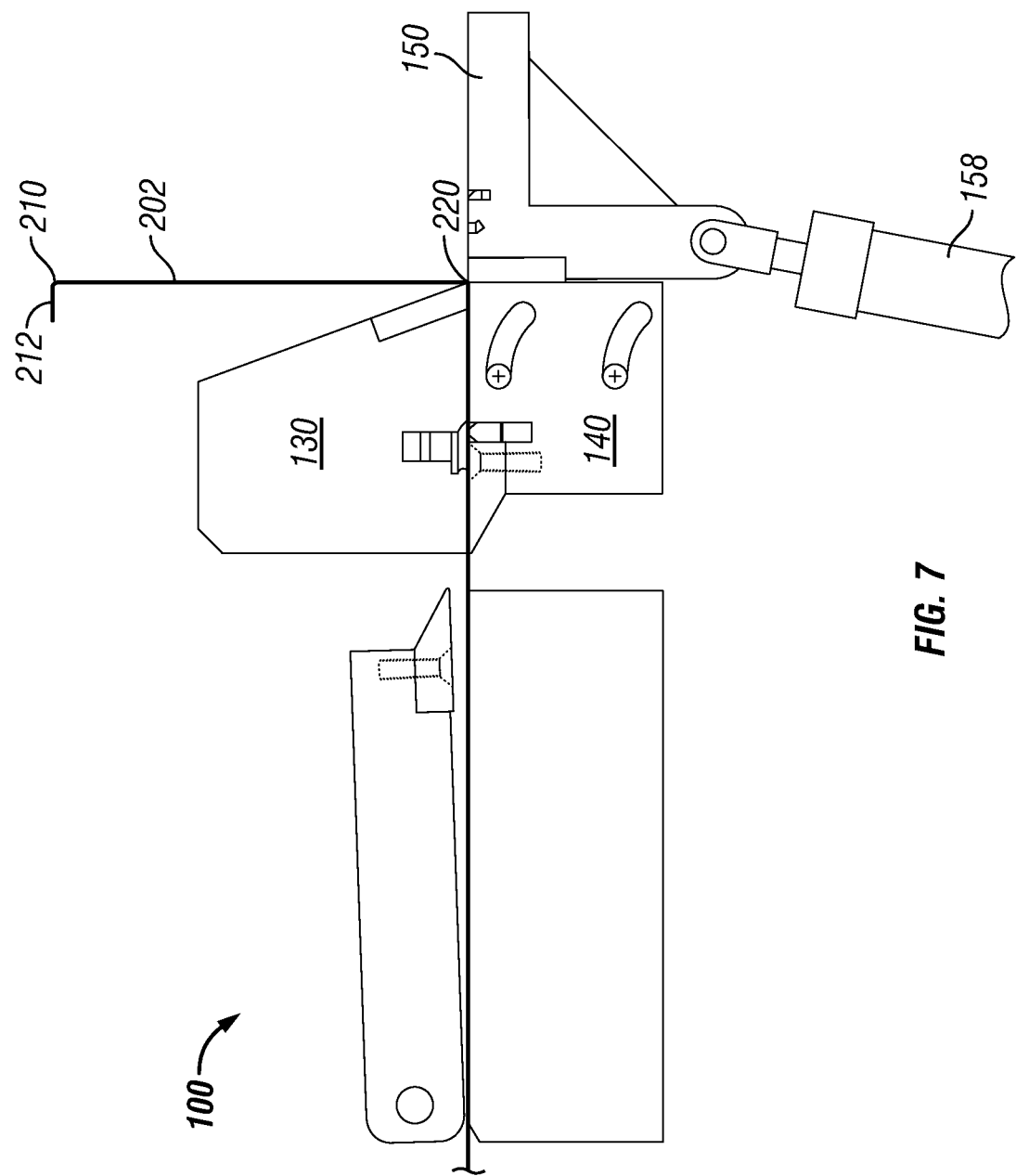
Figure 8:
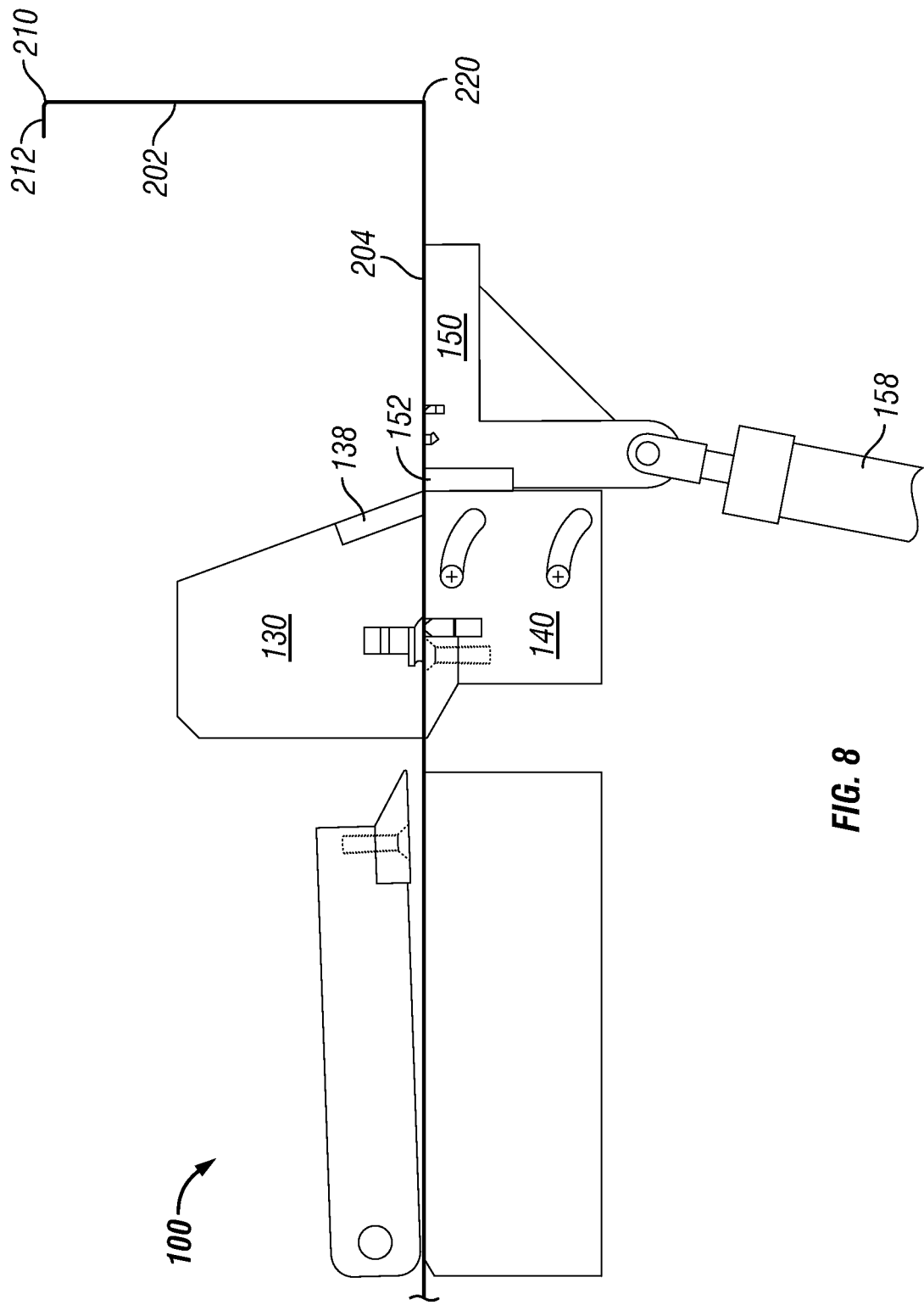
Figure 9:
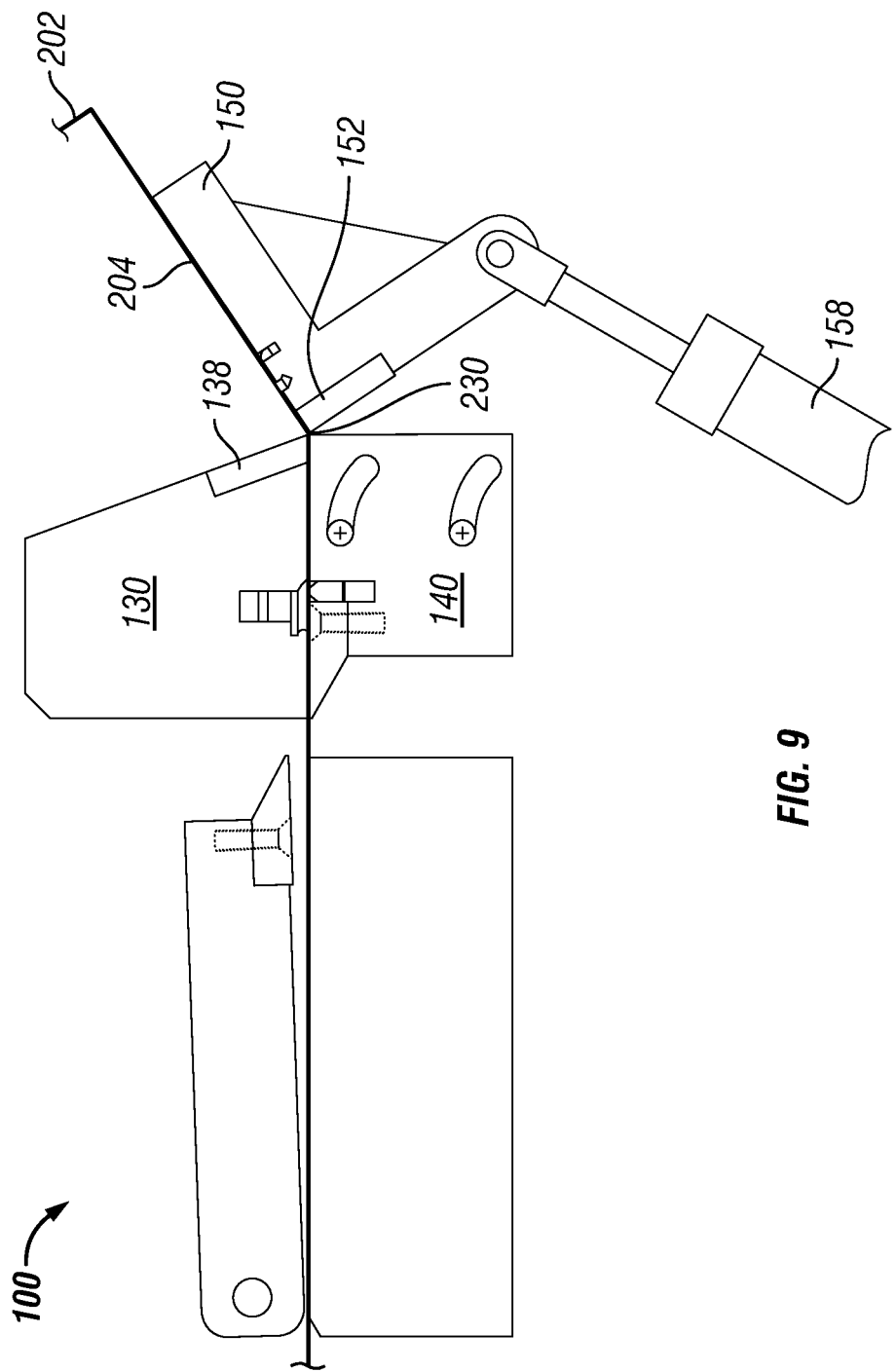
Figure 10:
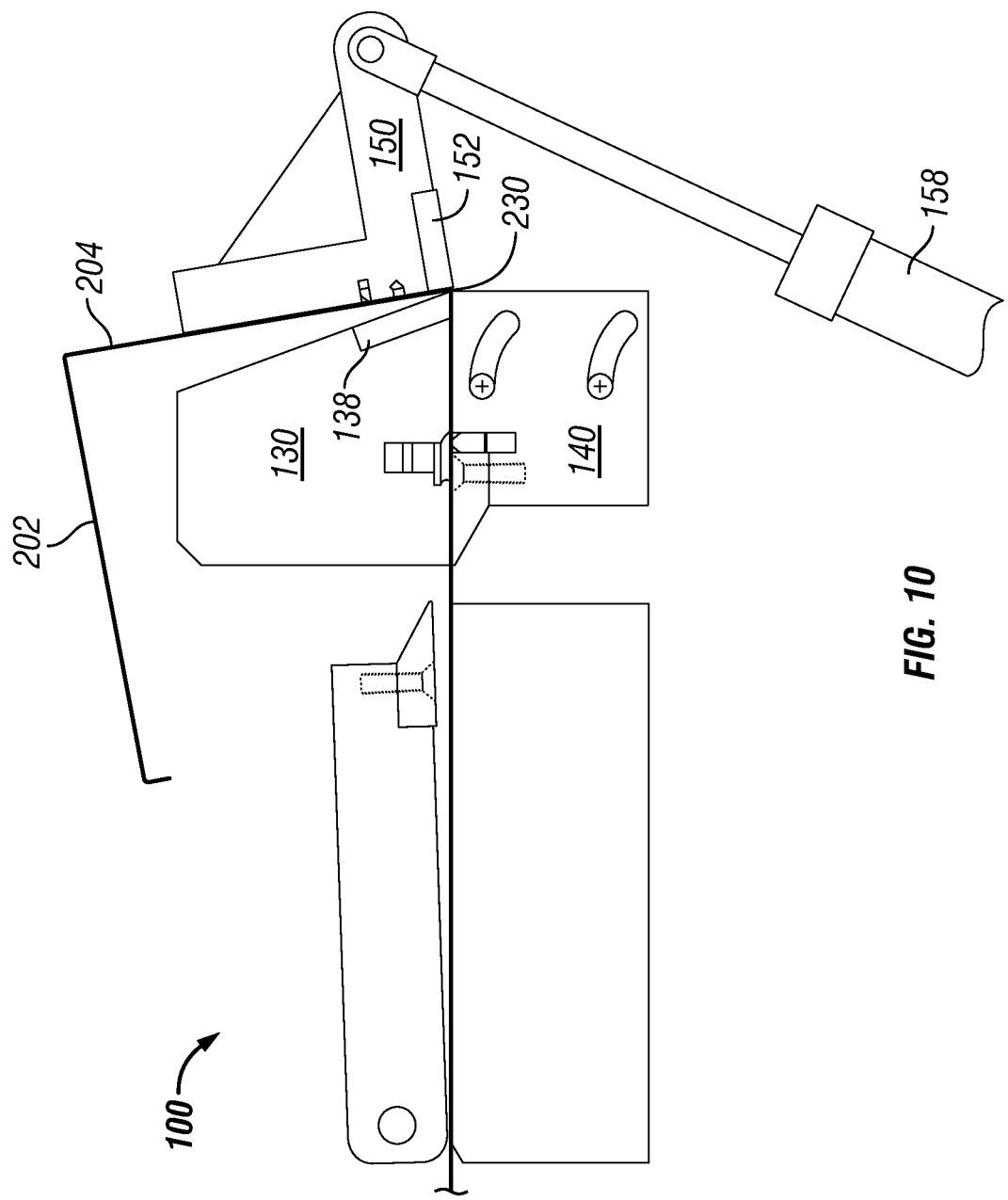
Figure 11:
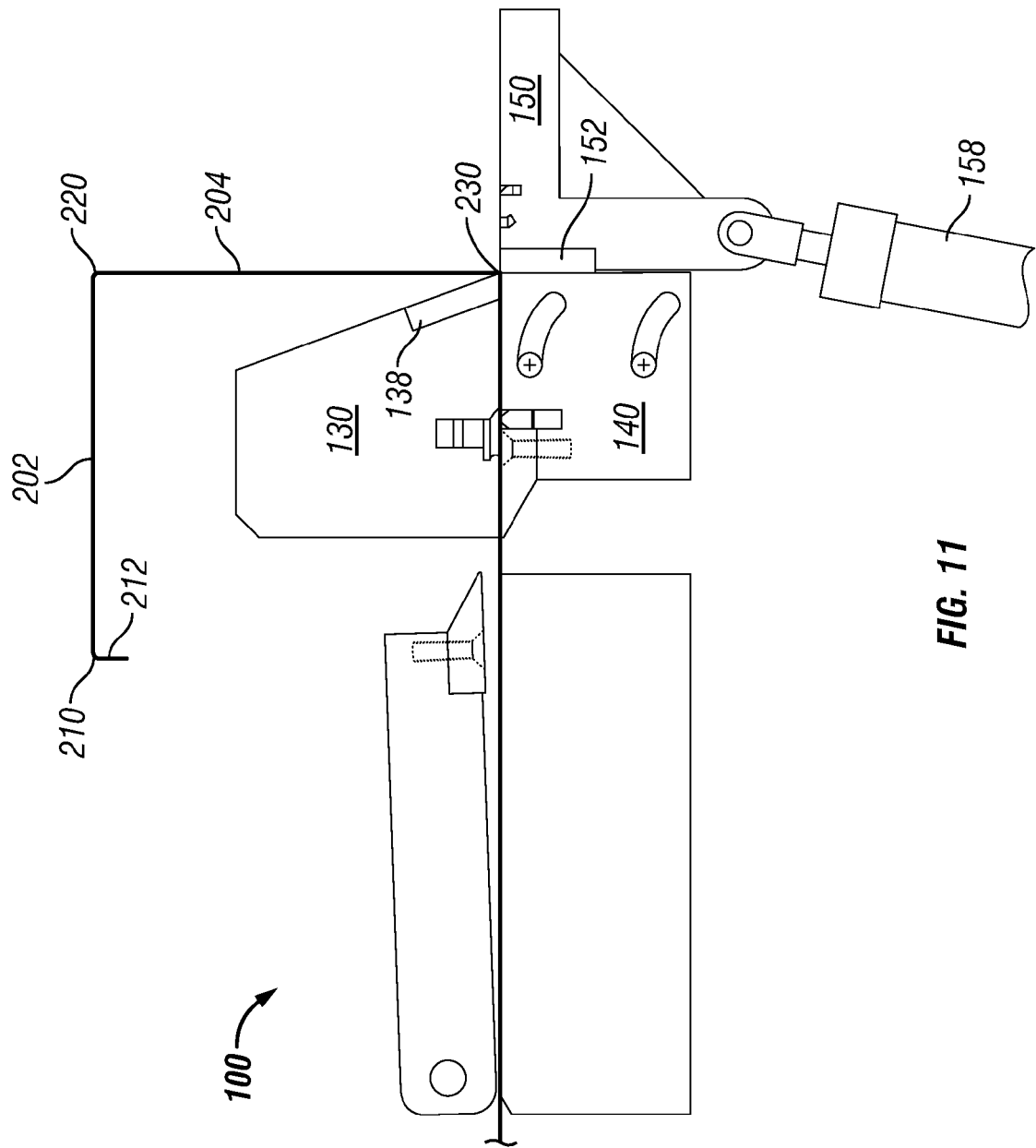
Figure 12:
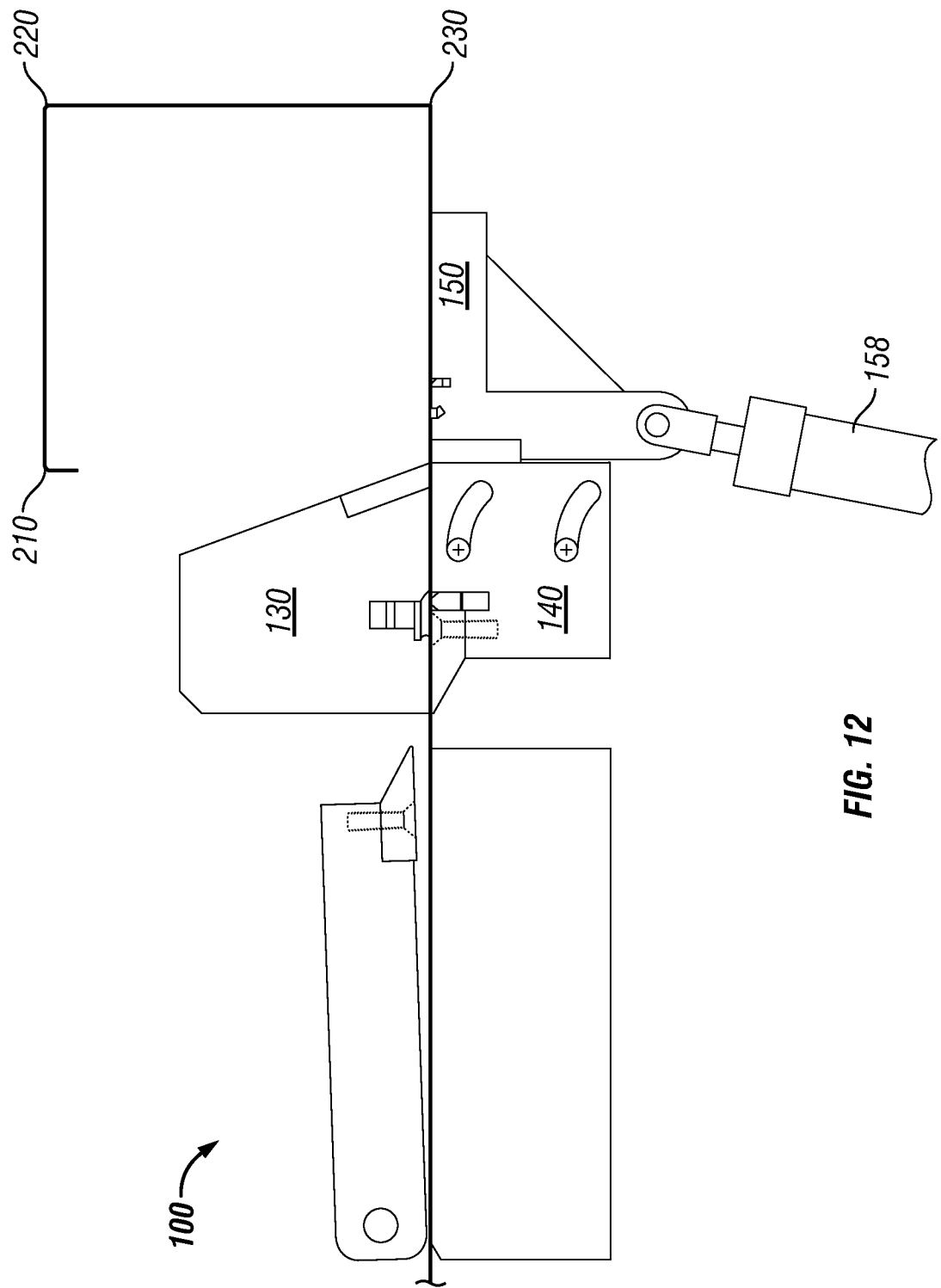
Figure 13:
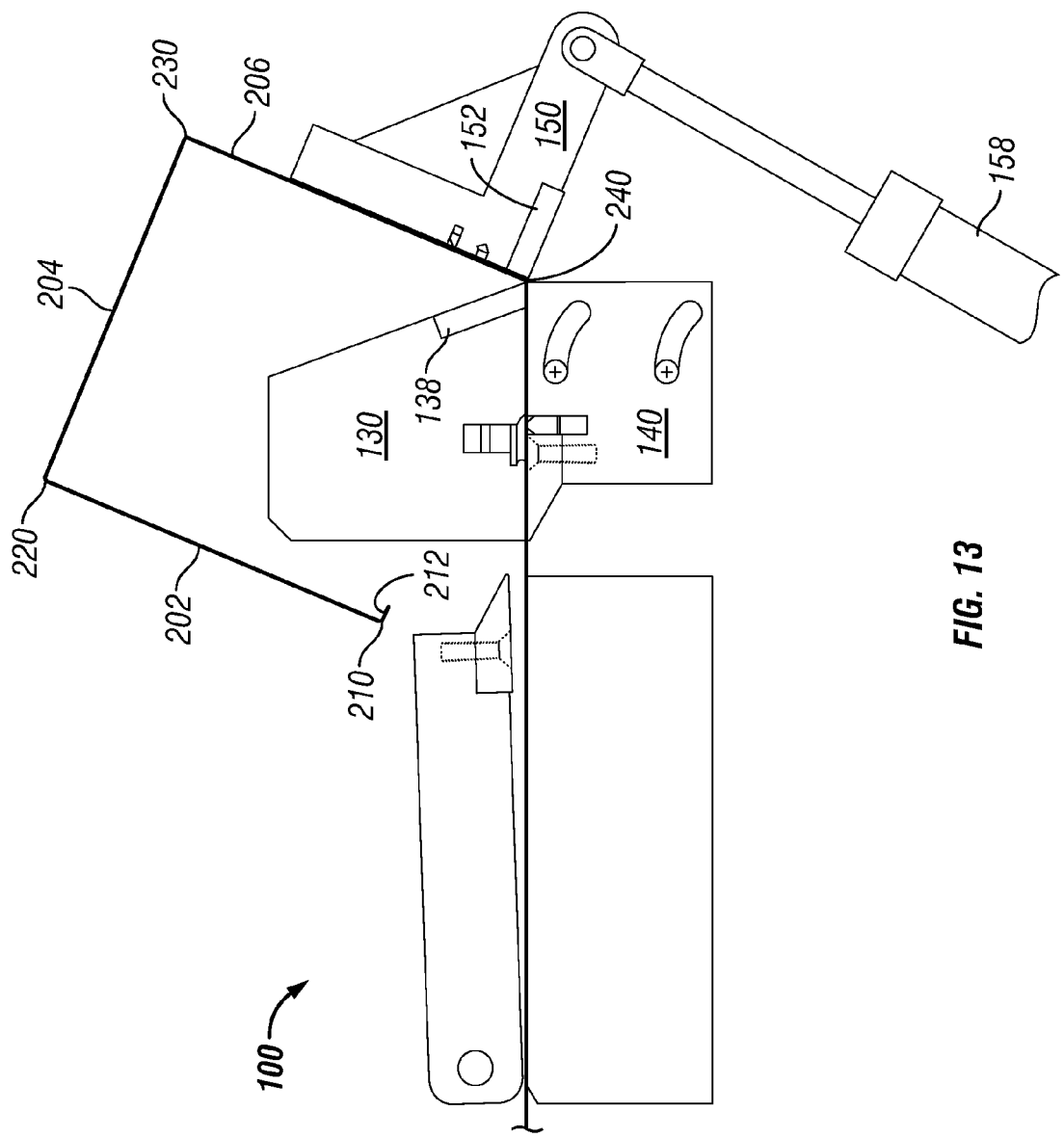
Figure 14:
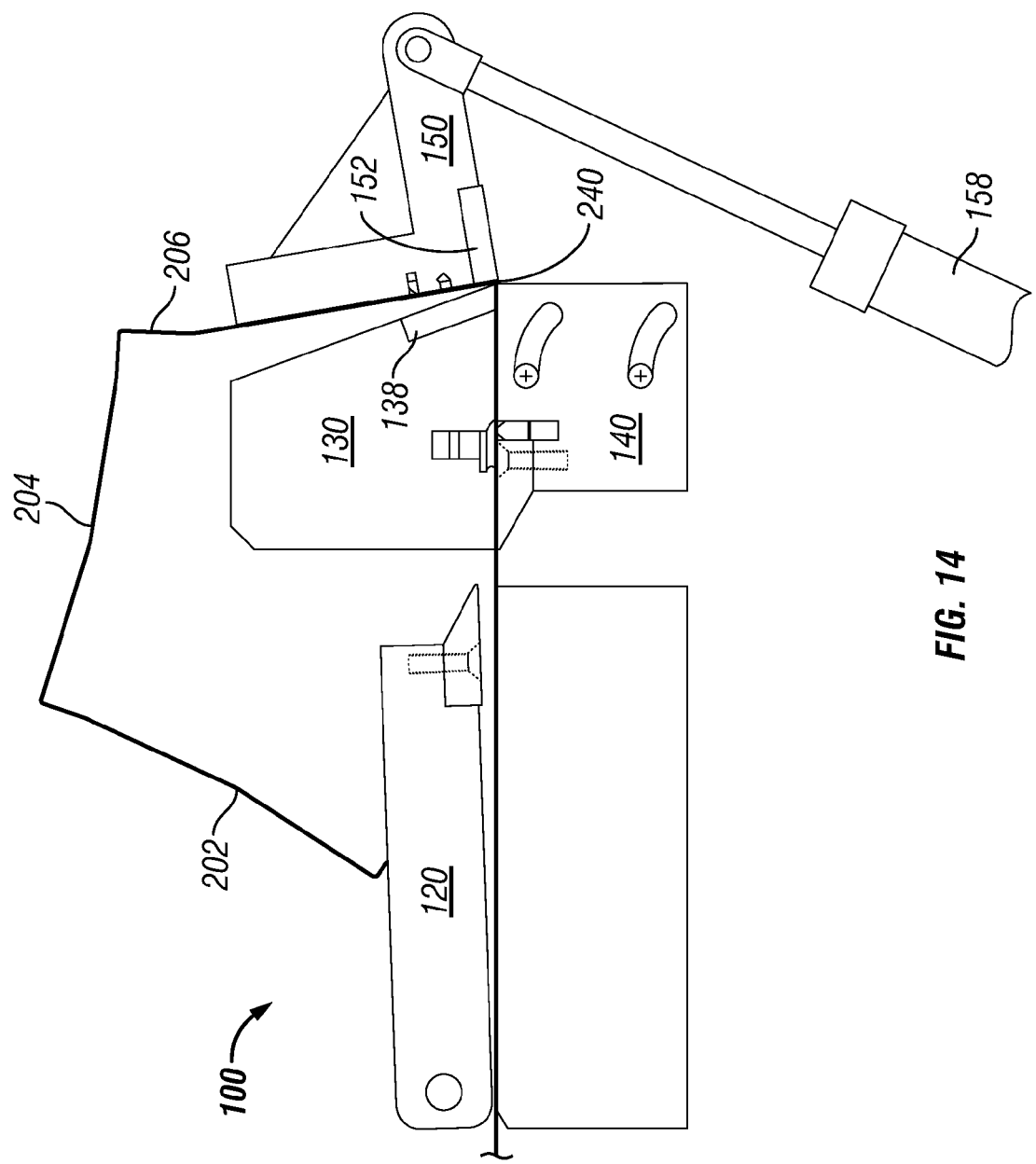
Figure 15:
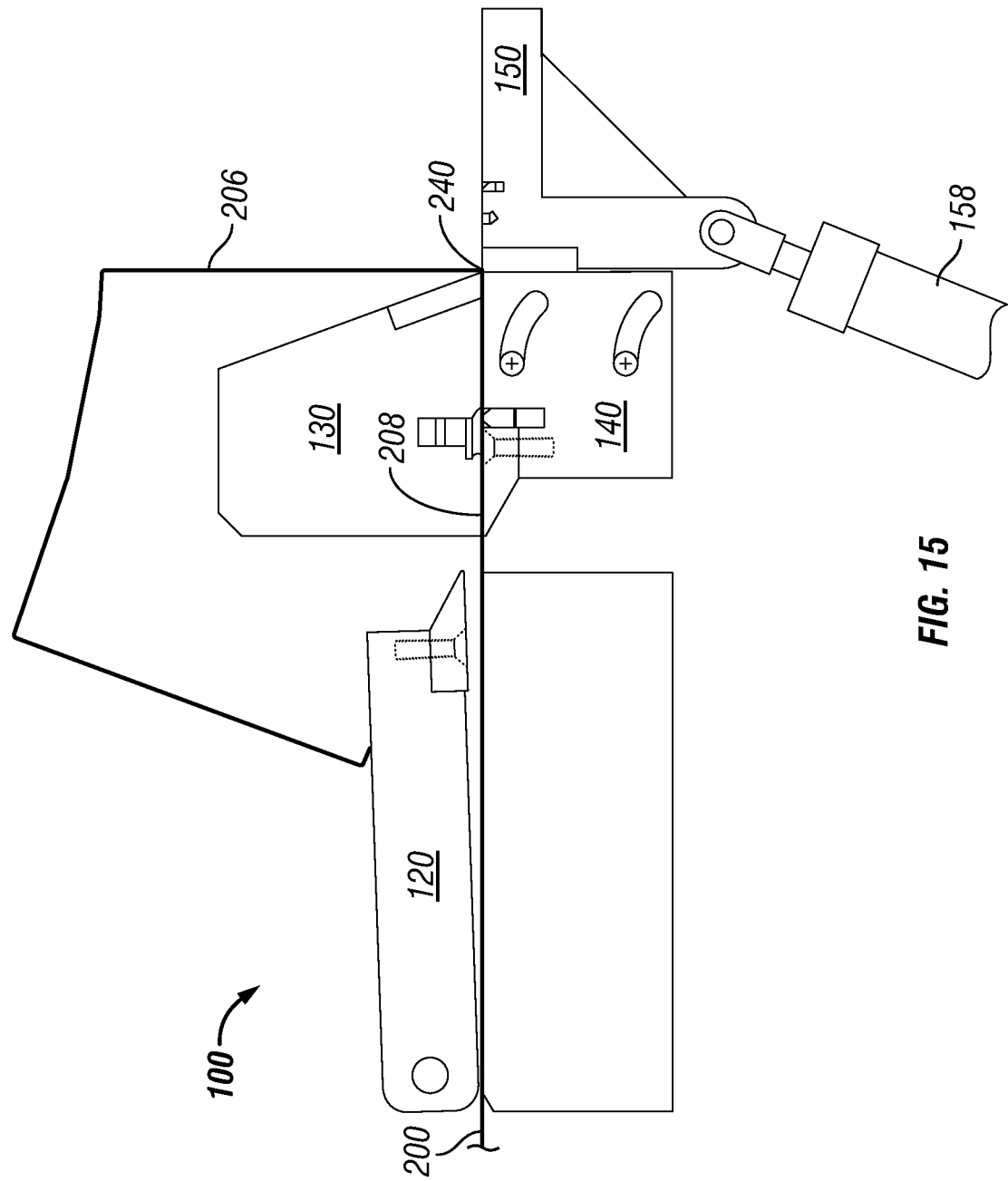

As shown in FIGS. 5-7, after a desired length of the metal web 200 has been fed, the clamp beam 130 secures the metal web 200 against the table 140 and the leaf ram 158 again extends to pivot the leaf 150 upward toward the inclined forward face of the clamp beam 130, thereby making an approximately ninety (90) degree first corner 220 in the metal web 200 between the first segment 202 and a second segment 204.

Referring to FIGS. 8-15, similar feed-and-bend operations are repeated to form a second corner 230 between the second segment 204 and a third segment 206, and to form a third corner 240 between the third segment 206 and a closing segment 208. In each feed-and-bed operation, the clamp beam 130 is raised from the table 140 while the metal web 200 is fed forward. When a desired length has been fed, the clamp beam 130 is lowered to secure the metal web, and the leaf ram 158 is extended, causing the leaf 150 to pivot and bend the metal web 200.

Figure 16:
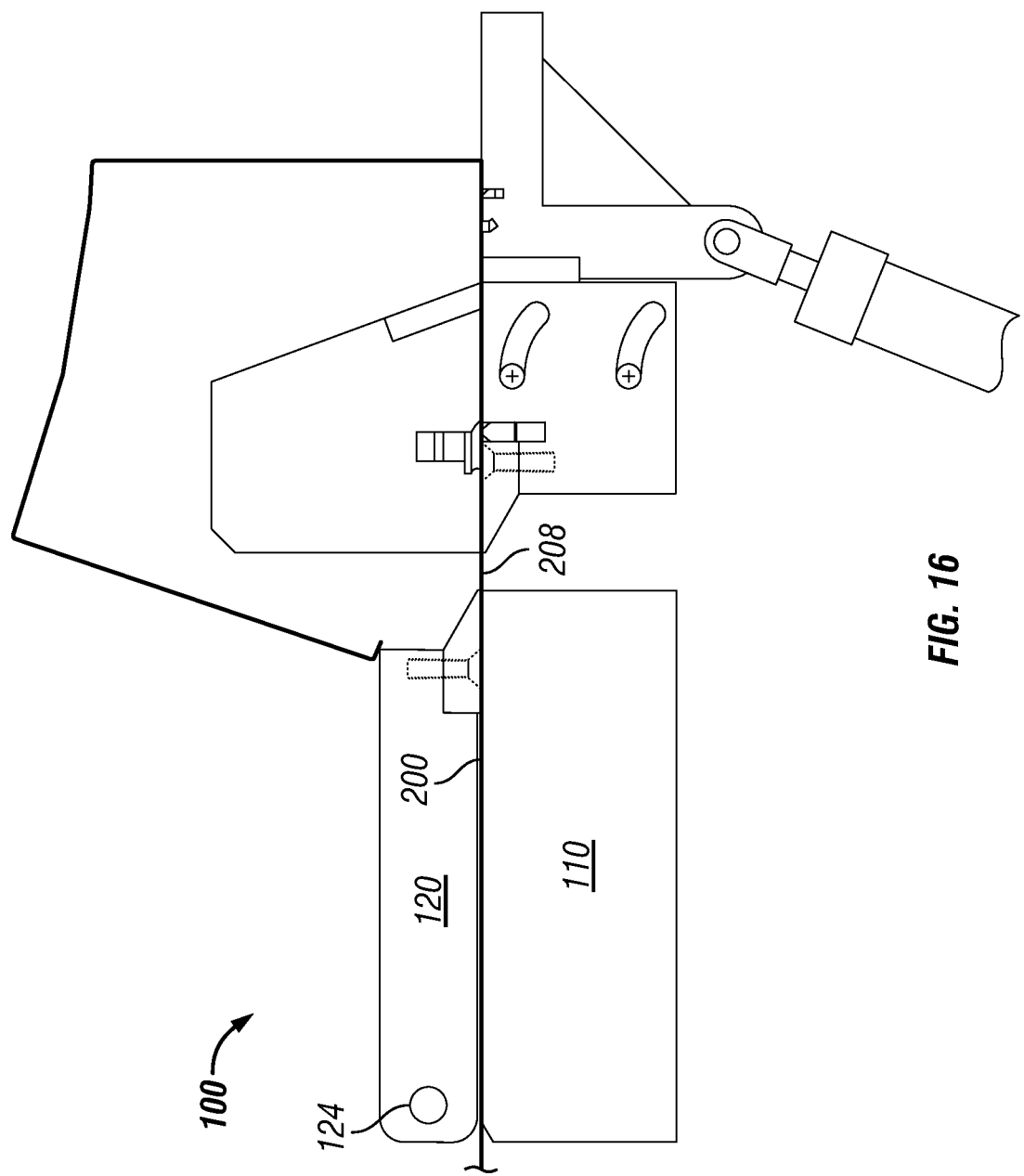

FIG. 16 shows the upper platen 120 pivoted about the axle 124 to clamp the metal web 200 against the lower platen 110, preparatory to forming a Z-fold 250 on the closing segment 208.

Figure 17:
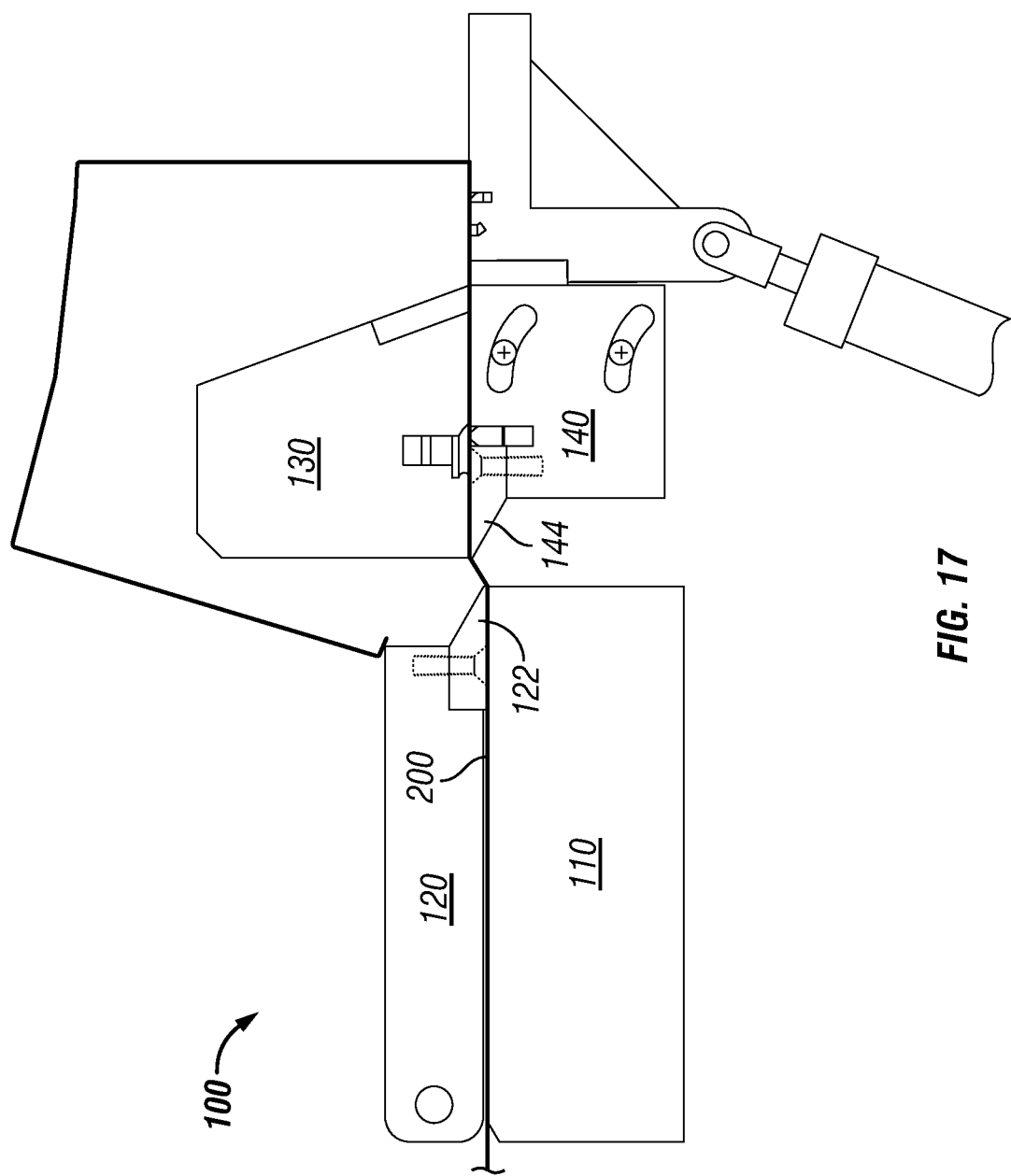
Figure 18:
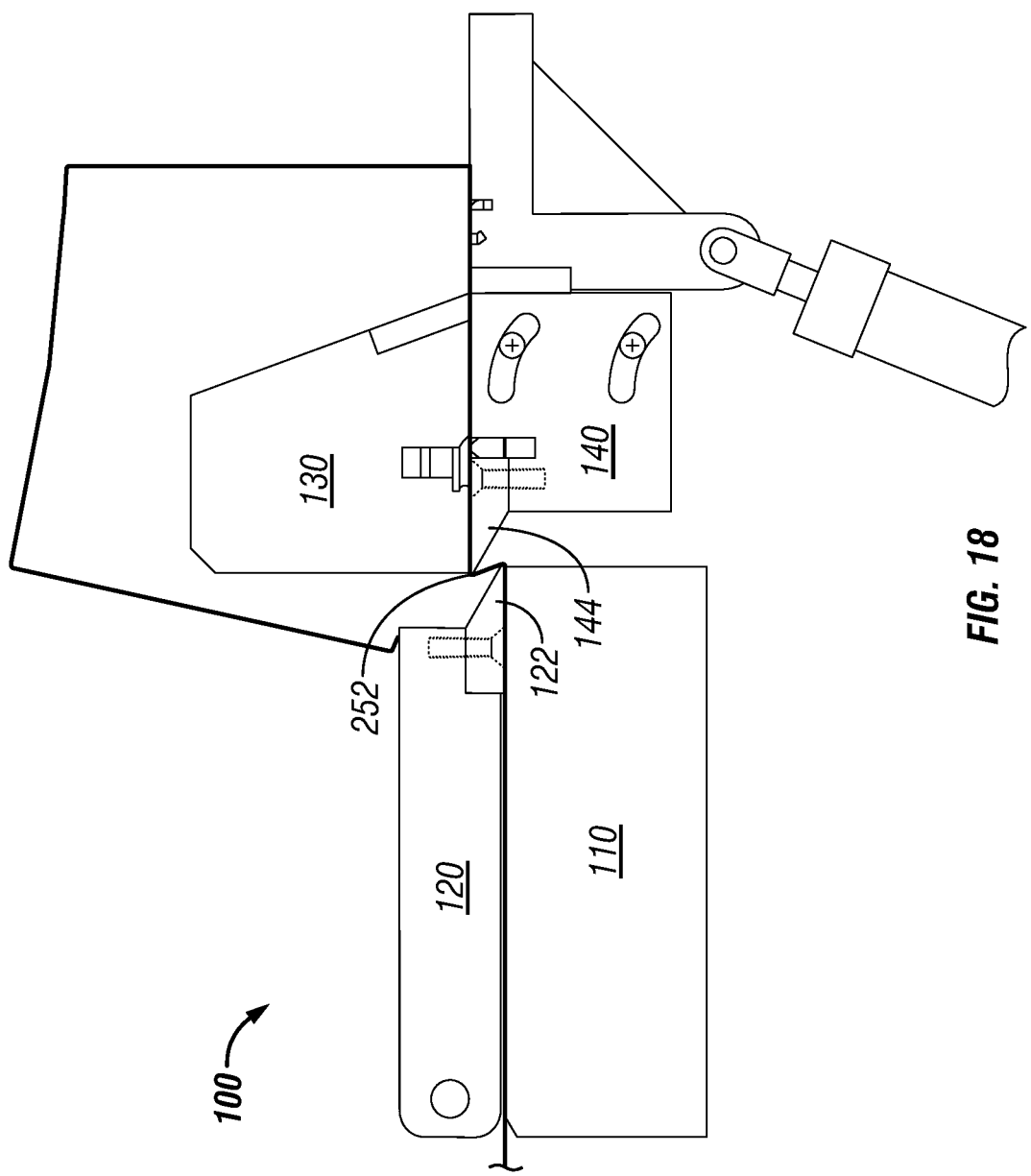
Figure 19:
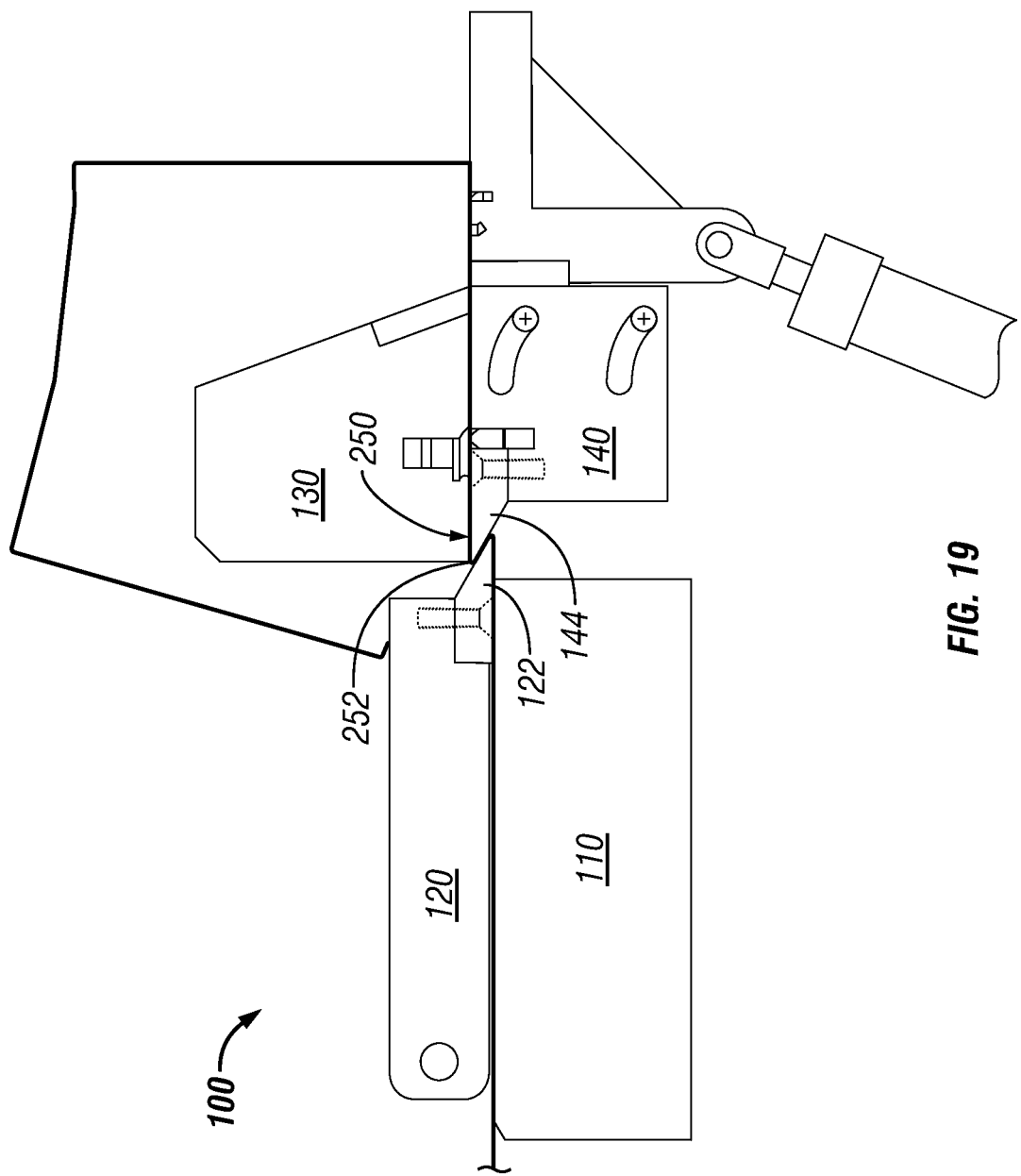

Referring to FIGS. 17-19, the subframe 160 moves on the upward and rearward path defined by the pivot pins 146 in the pivot slots 148, thereby forming the Z-fold 250 with a nose 252 by cooperation of the beak 144 with the jaw 122. Throughout the motions of FIGS. 17-19, the upper platen 120 clamps the metal web 200 to lower platen 110 and the clamp beam 130 clamps the metal web 200 to the table 140. Optimally, the rearward edge of the beak 144 remains at a substantially constant distance from the forward edge of the jaw 122 to avoid excessive strain on the metal web 200. (By "substantially" constant, it is meant constant, but for variances originating from manufacturing tolerances or wear within normal specifications.)

Figure 20:
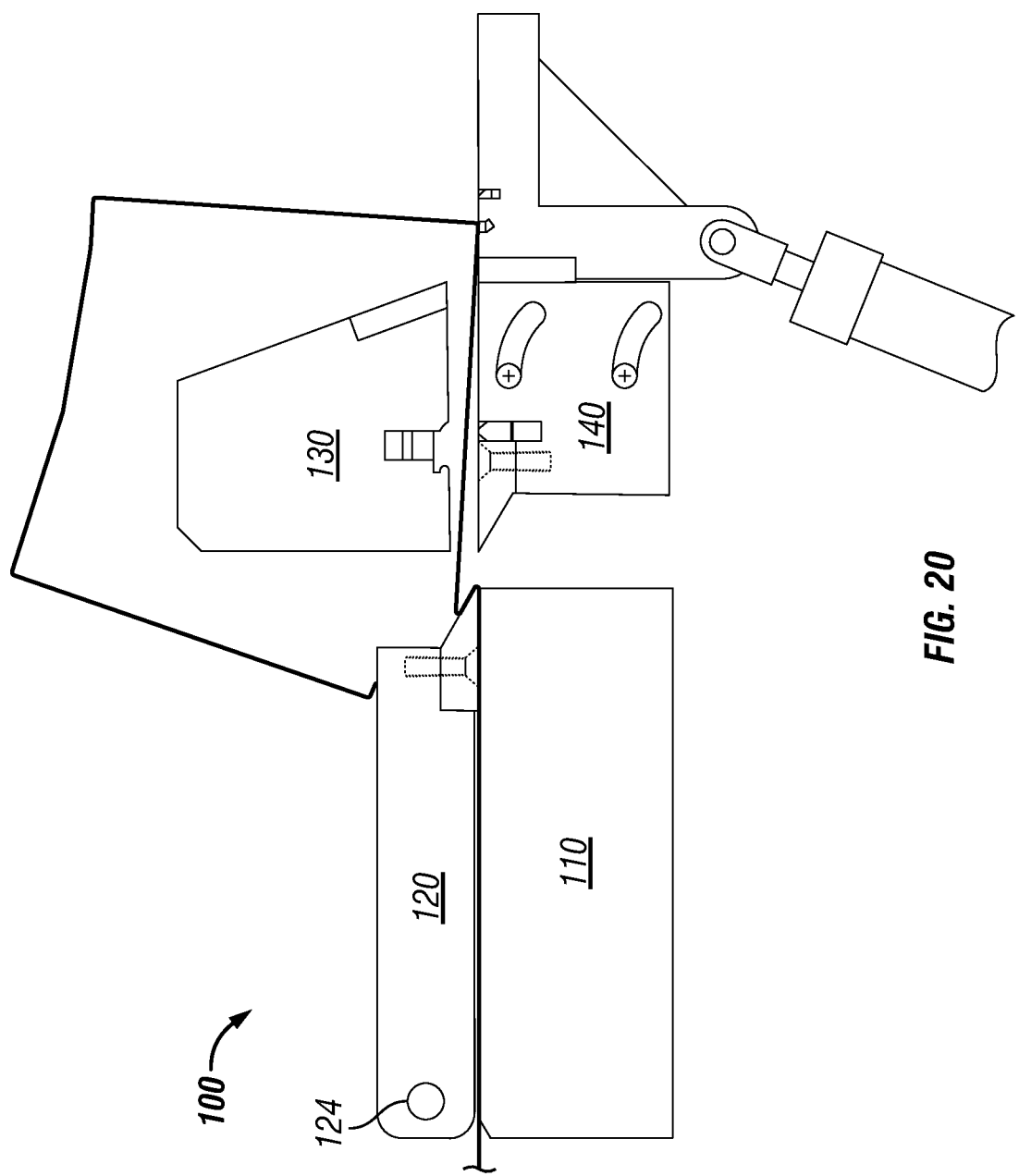
Figure 21:
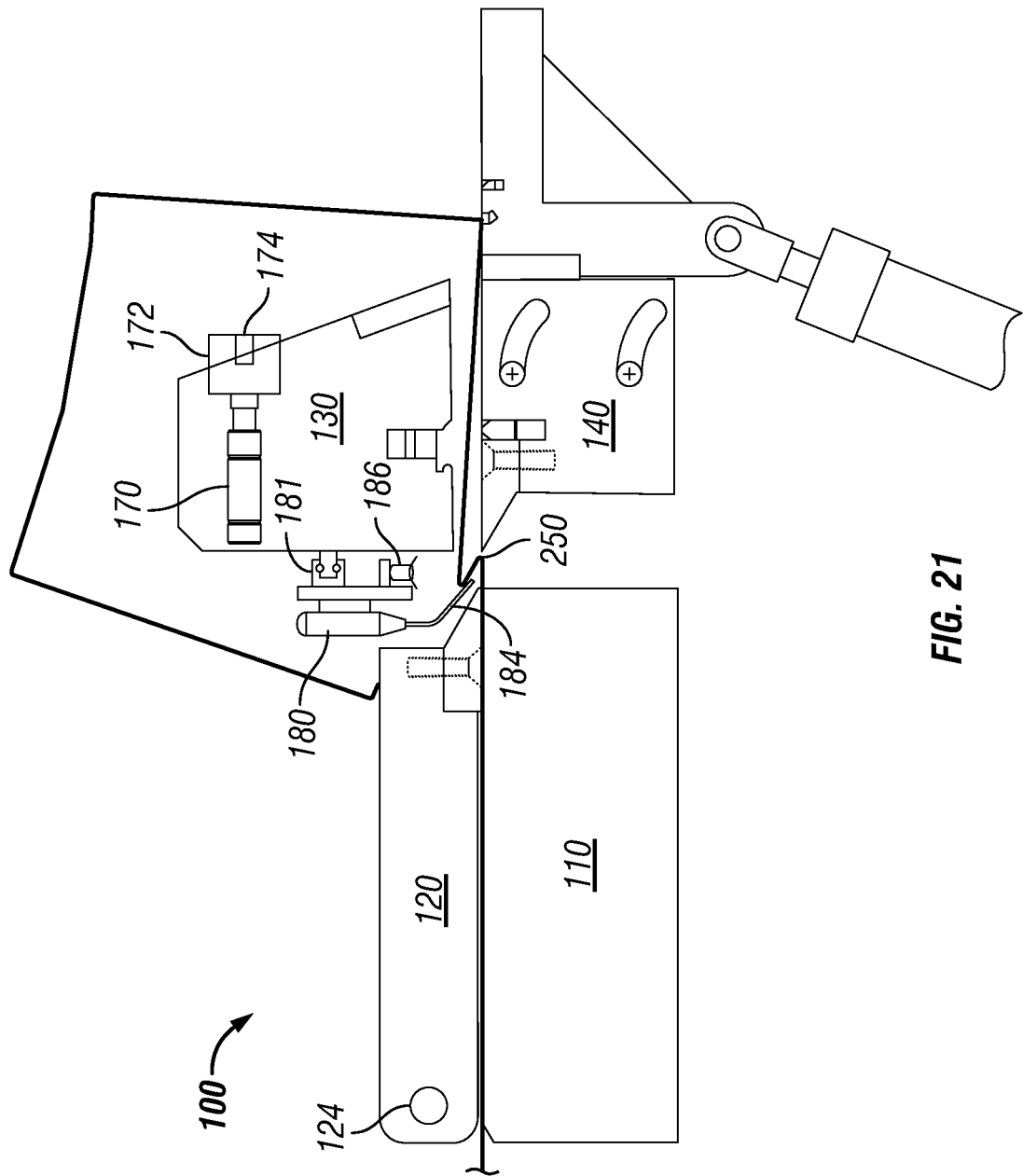

Referring to FIG. 20, the upper platen 120 pivots around the axle 124 and the clamp beam 130 moves upward from the table 140, releasing the metal web 200.

As shown in FIG. 21, the metal web 200 is fed forward an intermediate distance to align the Z-fold 250 with the injection path of the sealant nozzle 184. The powered slide 181 moves the sealant injector 180 along the injection path, parallel to the Z-fold 250, to deposit the sealant bead 187 along an inner surface of the Z-fold 250. The sealant nozzle 184 is actuated to start depositing the sealant bead 187 when the optical sensor 186 senses entering a first lateral edge of the metal web 200. The sealant nozzle 184 is actuated to stop depositing the sealant bead 187 when the optical sensor 186 senses exiting a second lateral edge of the metal web 200. The sealant injector 180 is retracted to an end of the slide 181.

Figure 22:
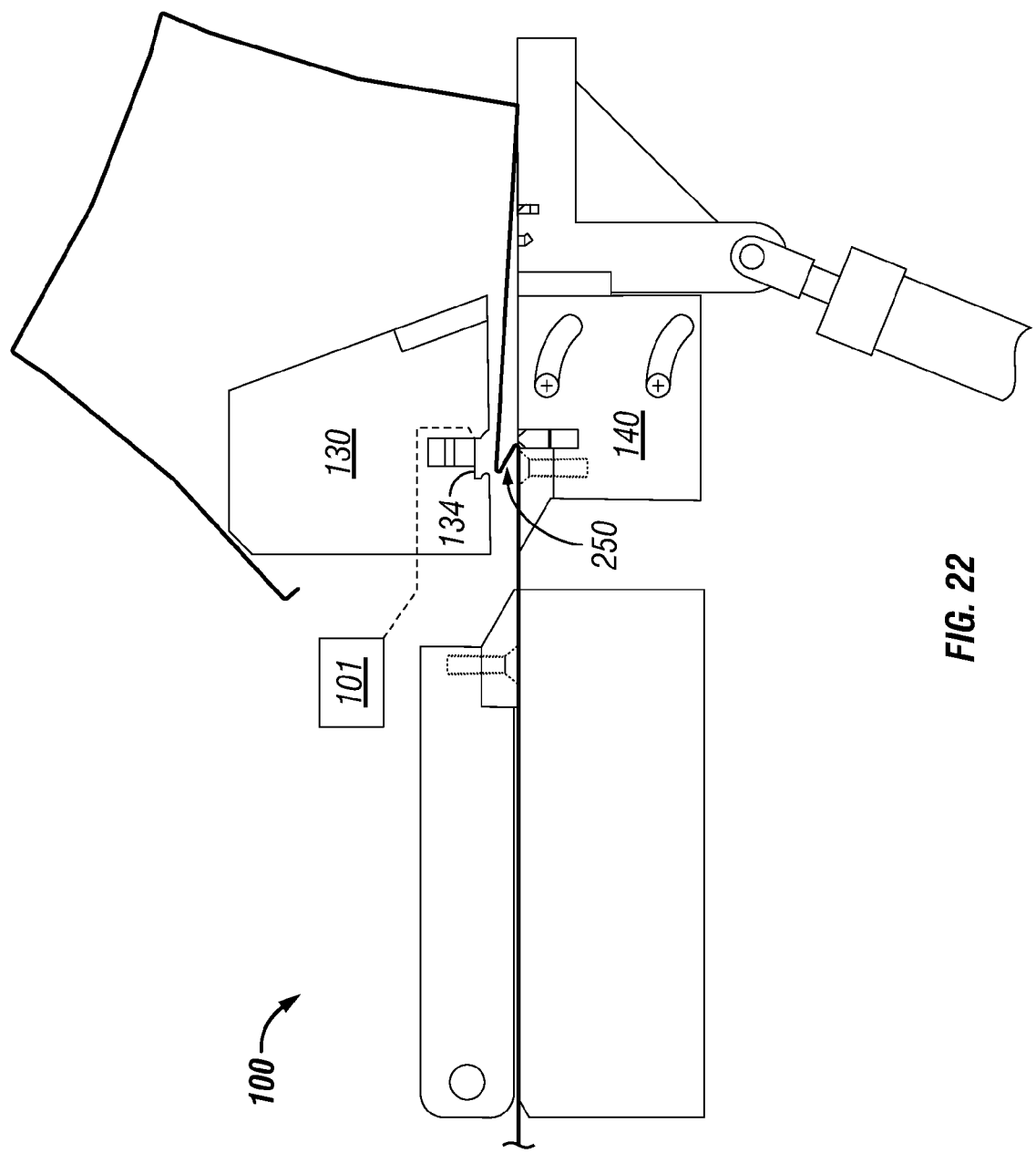

Referring to FIG. 22, the metal web 200 is fed forward to align the Z-fold 250 with the groove 134 formed in the clamp beam 130. In one embodiment, the controller 101 feeds the metal web 200 a pre-determined forward distance to achieve alignment of the Z-fold 250 with the groove 134. The upper platen 120 then pivots around the axle 124 to clamp the metal web 200 against the lower platen 110.

Figure 23:
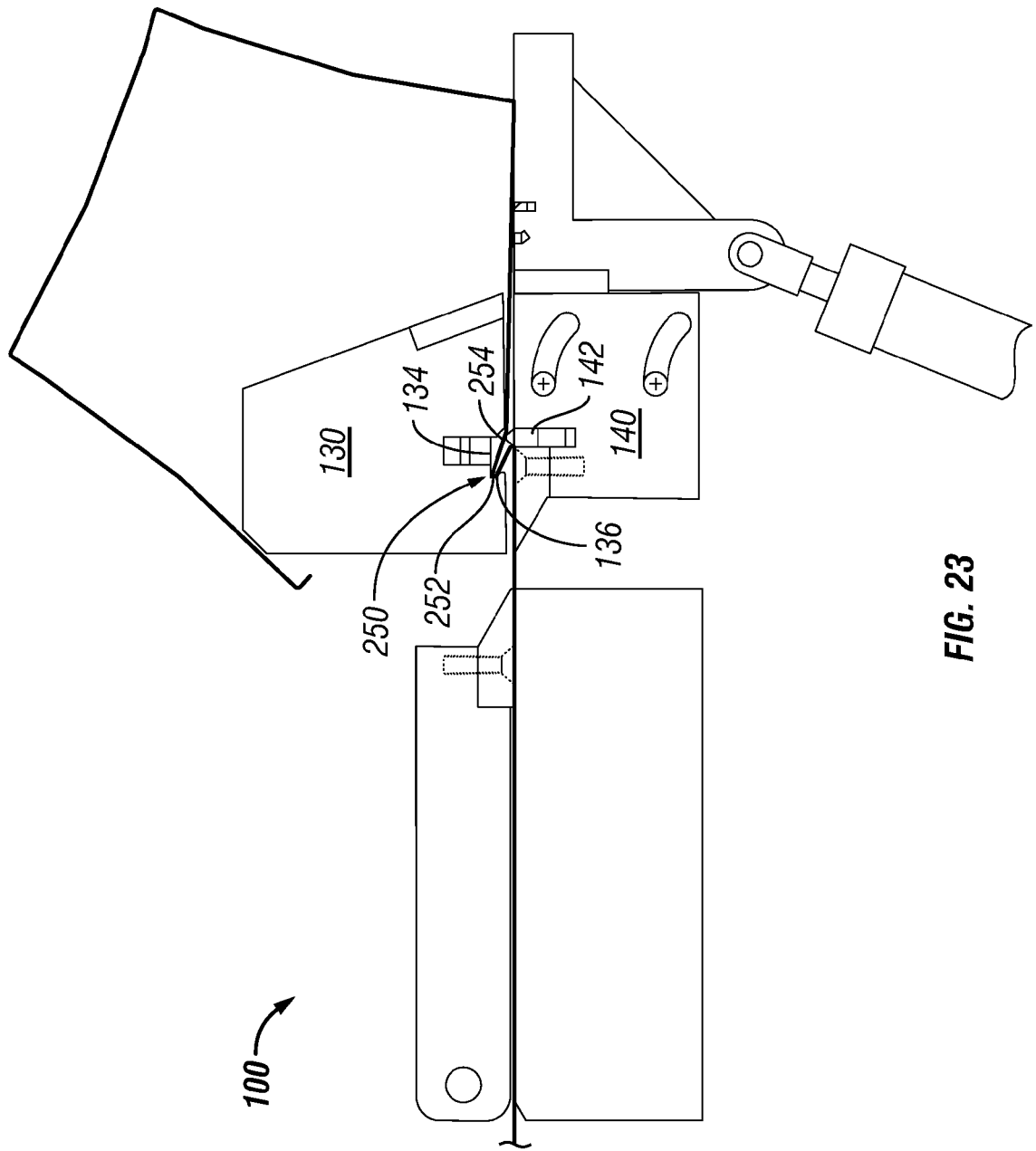
Figure 24:
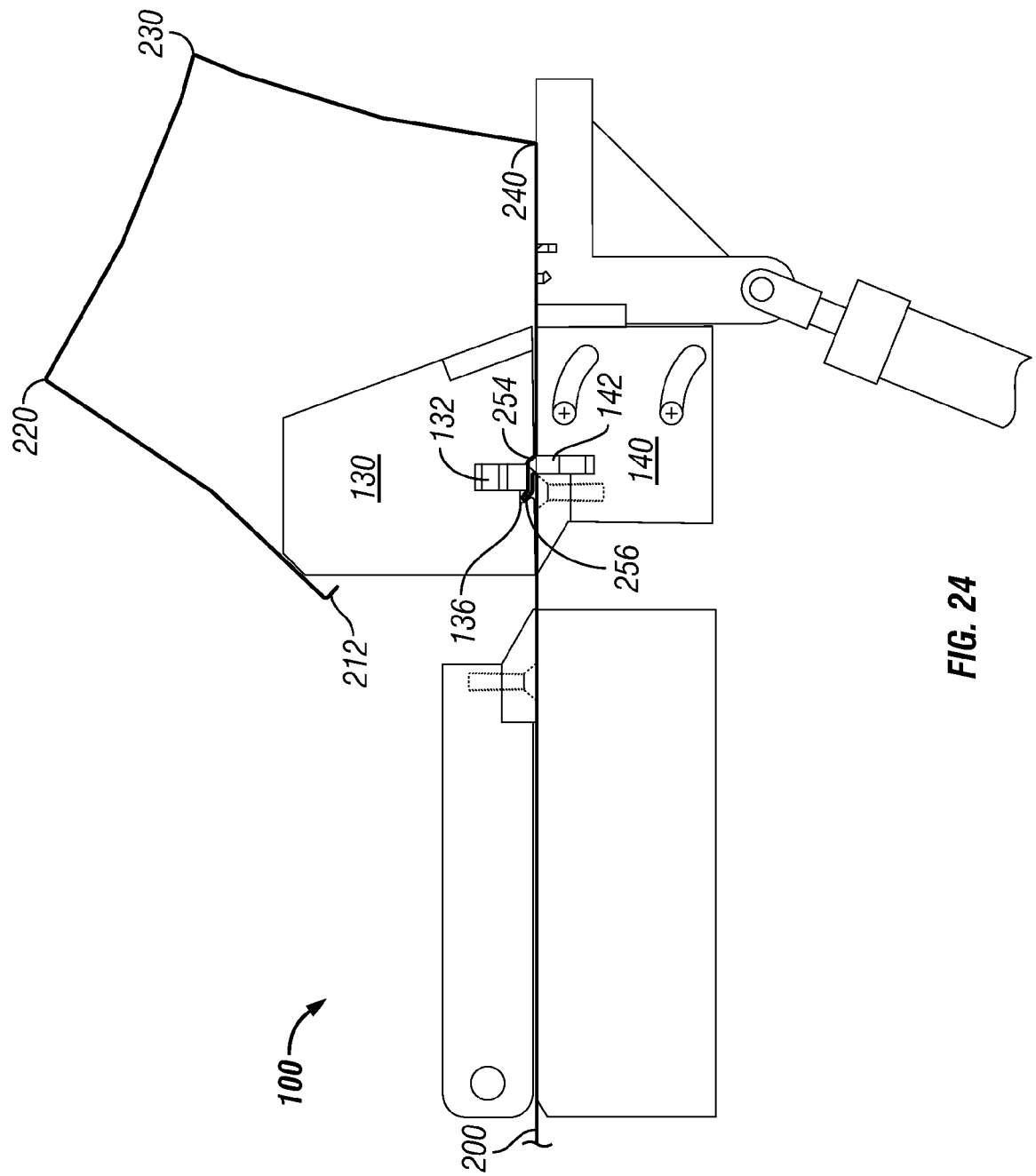

Referring to FIGS. 23-24, the clamp beam 130 presses the metal web 200 against the table 140 and causes the Z-fold 250 to be squeezed into the groove 134 so that the nose 252 of the Z-fold 250 is captured in the rearward pocket 136 of the groove 134. The lower insert 142 is extended upward from the table 140 to press a forward portion of the Z-fold 250 into the groove 134, thereby forming an inward offset 254. The upper insert 132 of the clamp beam 130 is extended downward to press the Z-fold 250 toward the table 140, thereby forming an insertion angle 256 adapted to receive the lock tab 212. Additionally, the upper insert 132 cooperates with the lower insert 142 to regulate the inward offset 254 and insertion angle 256 based on a thickness of the metal web 200.

Figure 25:
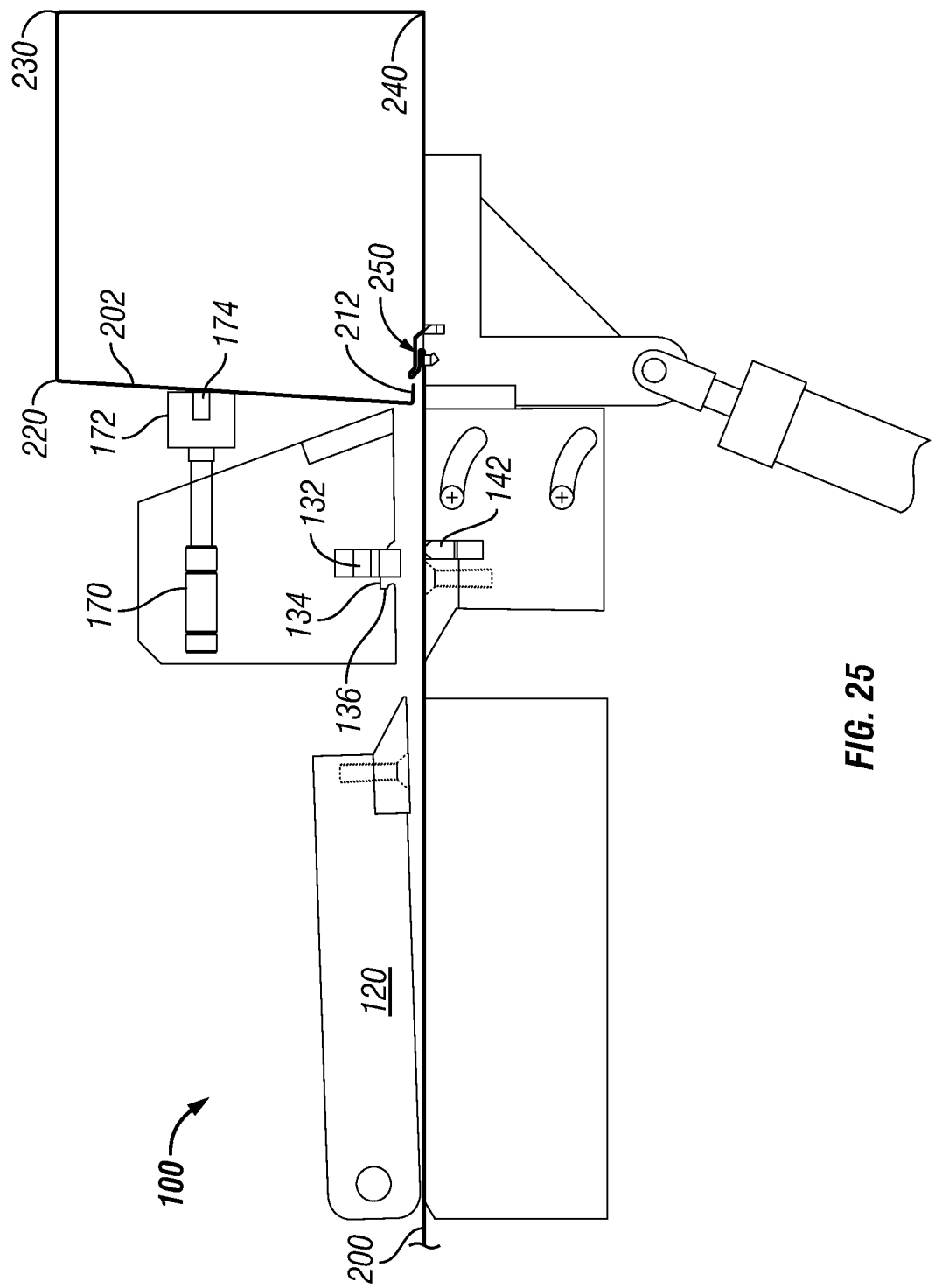

FIGS. 25-30 show the apparatus 100 forming the pre-bend 310. As shown in FIG. 25, the upper platen 120 and the clamp beam 130 are raised to release the metal web 200. Simultaneously, the lower insert 142 is retracted, and the upper insert 132 is further extended to eject the Z-fold 250 from the groove 134 and the groove 134. The metal web 200 is fed forward and the ram 170 and the gripper 172 are actuated to grab the first segment 202. With the gripper 172 holding the first segment 202, the clamp beam 130 is lowered toward the table 140, thereby positioning the lock tab 212 adjacent to the Z-fold 250.

Figure 26:
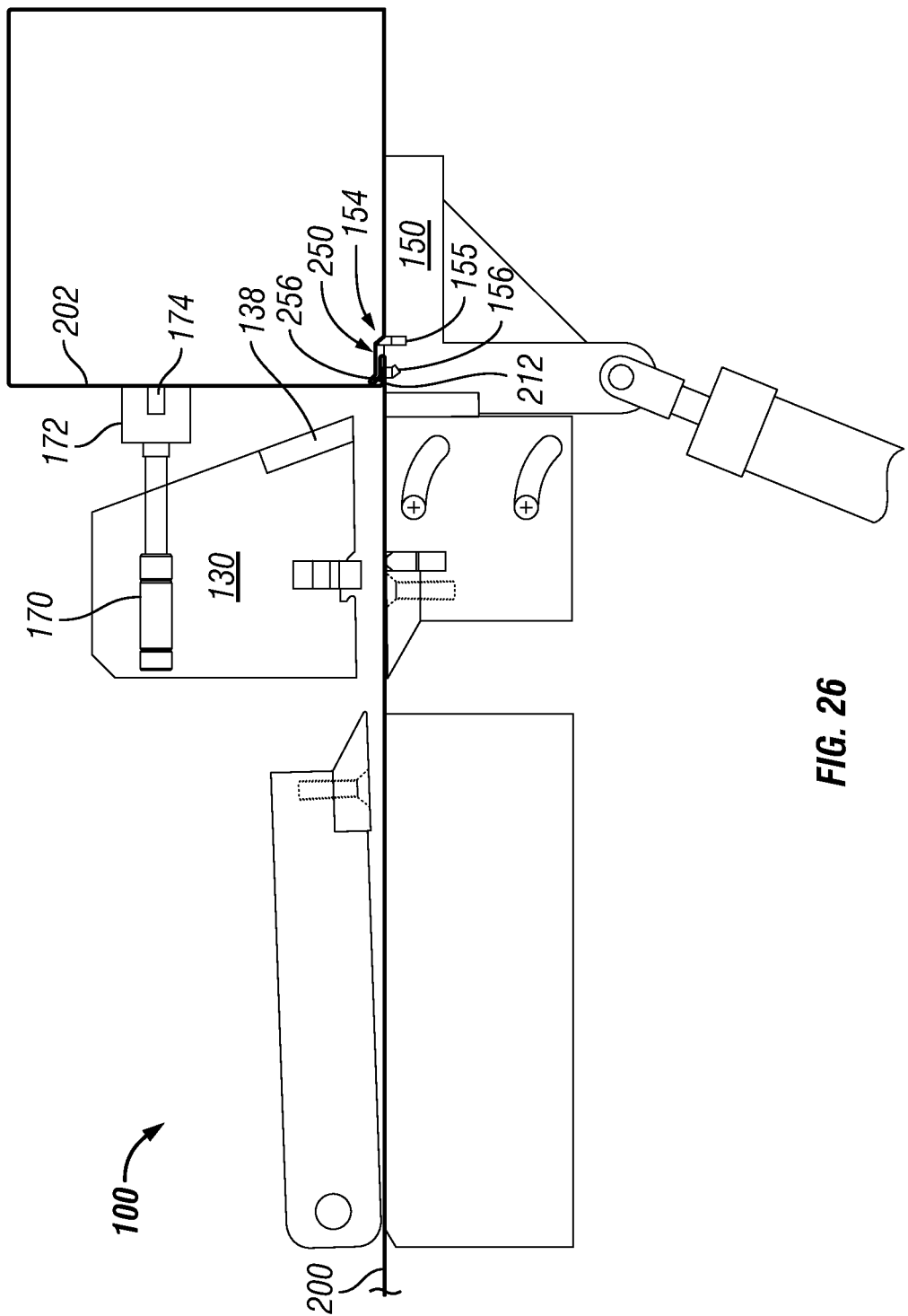

As shown in FIG. 26, the lock tab 212 is inserted into the insertion angle 256 of the Z-fold 250 by extending the ram 170 to move the gripper 172 forward. Alternatively, the lock tab 212 can be inserted into the insertion angle 256 by retracting the metal web 200, or by pivoting the leaf 150 upward, so that the first shear blade 138 presses against the first segment 202.

Figure 27:
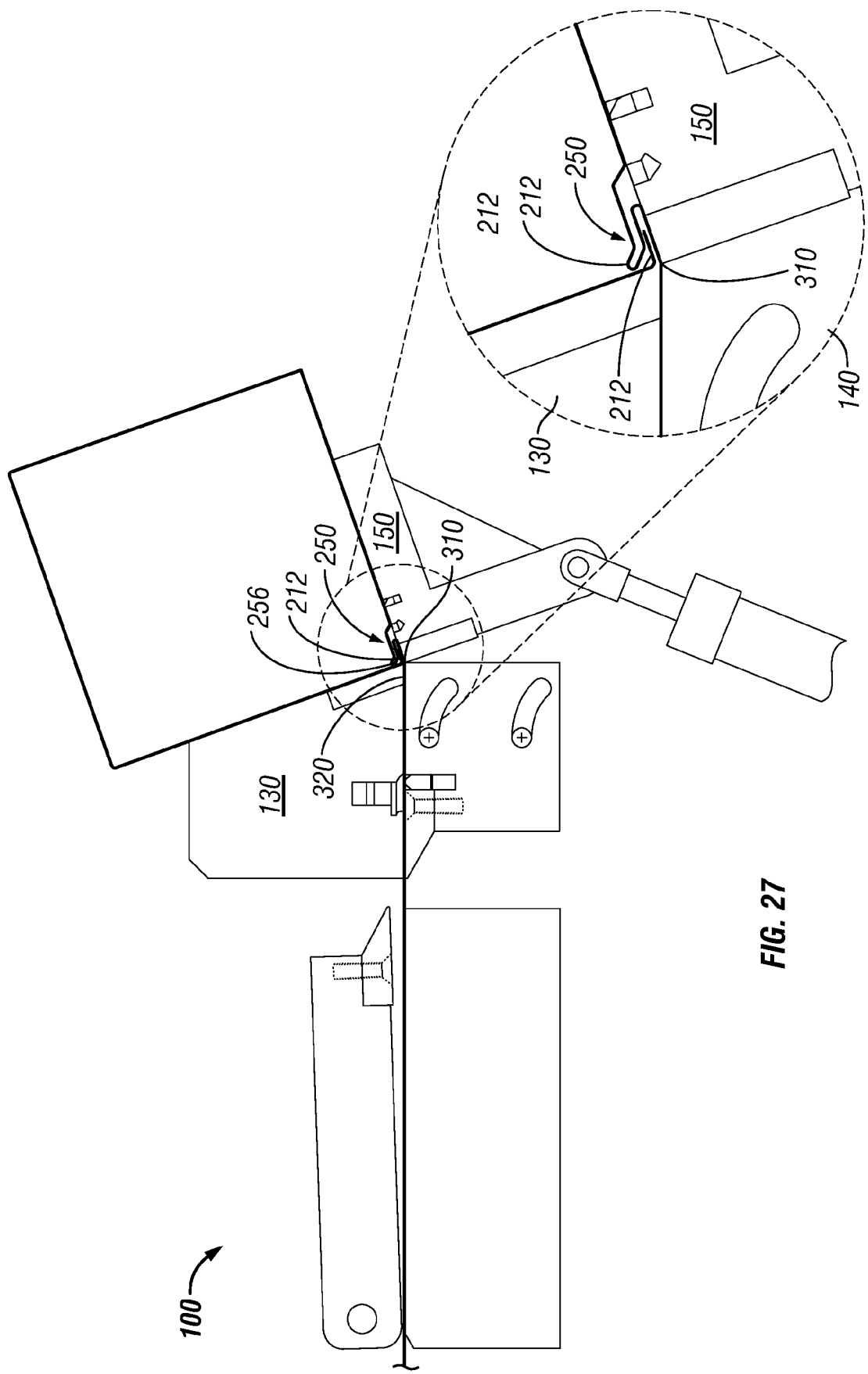

Referring to FIG. 27, once the lock tab 212 is inserted into the insertion angle 256, the leaf 150 pivots upward relative to the clamp beam 130, bending the Z-fold 250 to form an approximately twenty (20) degree pre-bend 310 adjacent to the lock tab 212.

Figure 28:
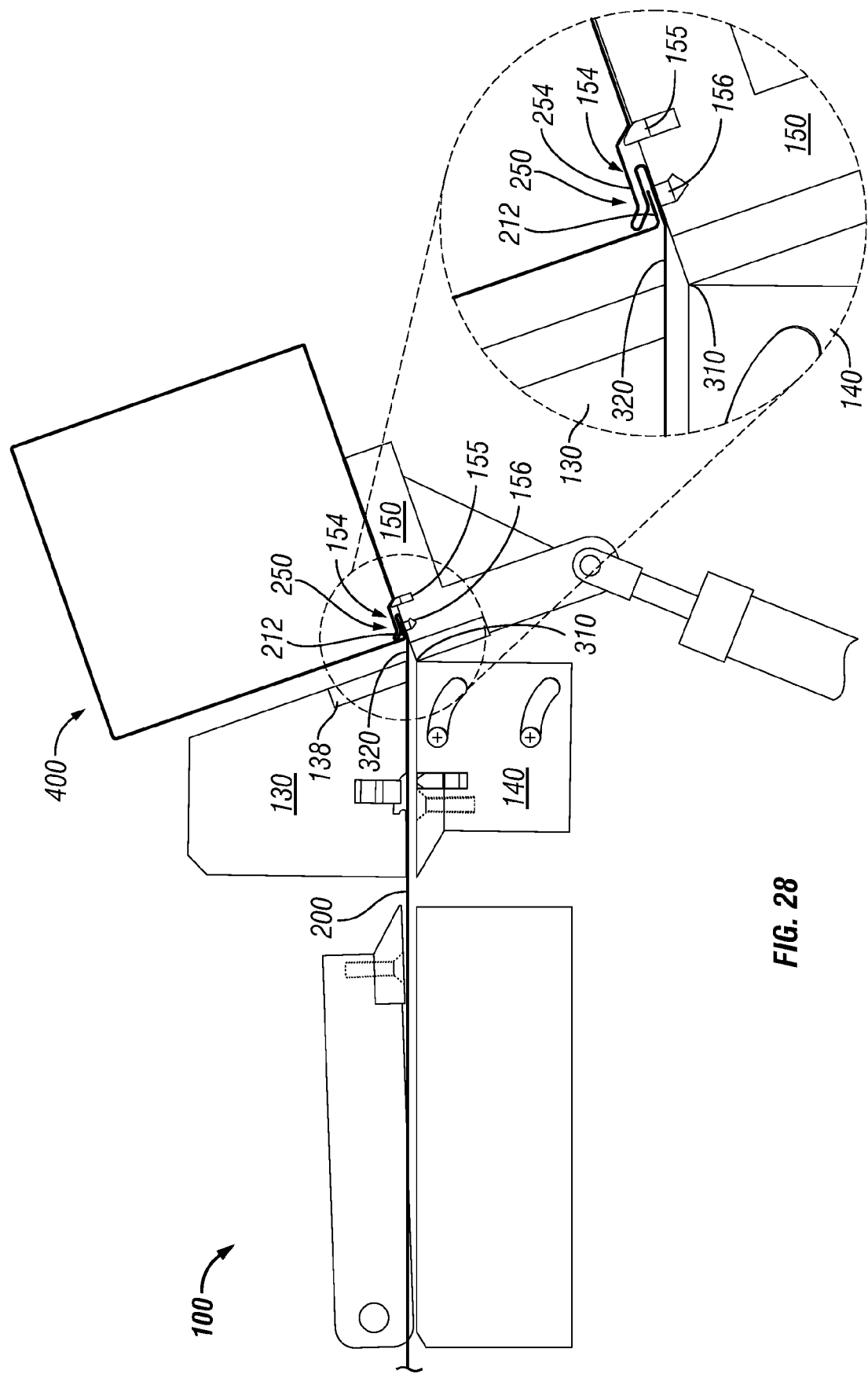

Referring to FIG. 28, the clamp beam 130 then moves upward to release the metal web 200, which is fed forward along the upward sloped surface of the leaf 150 for forming a clinch tab 320 extending rearward from the pre-bend 310. The metal web 200 is fed forward until the retractable rib 155 engages into the inward offset 254, as shown in FIG. 31, thereby securing the metal web 200 to the leaf 150.

Figure 29:
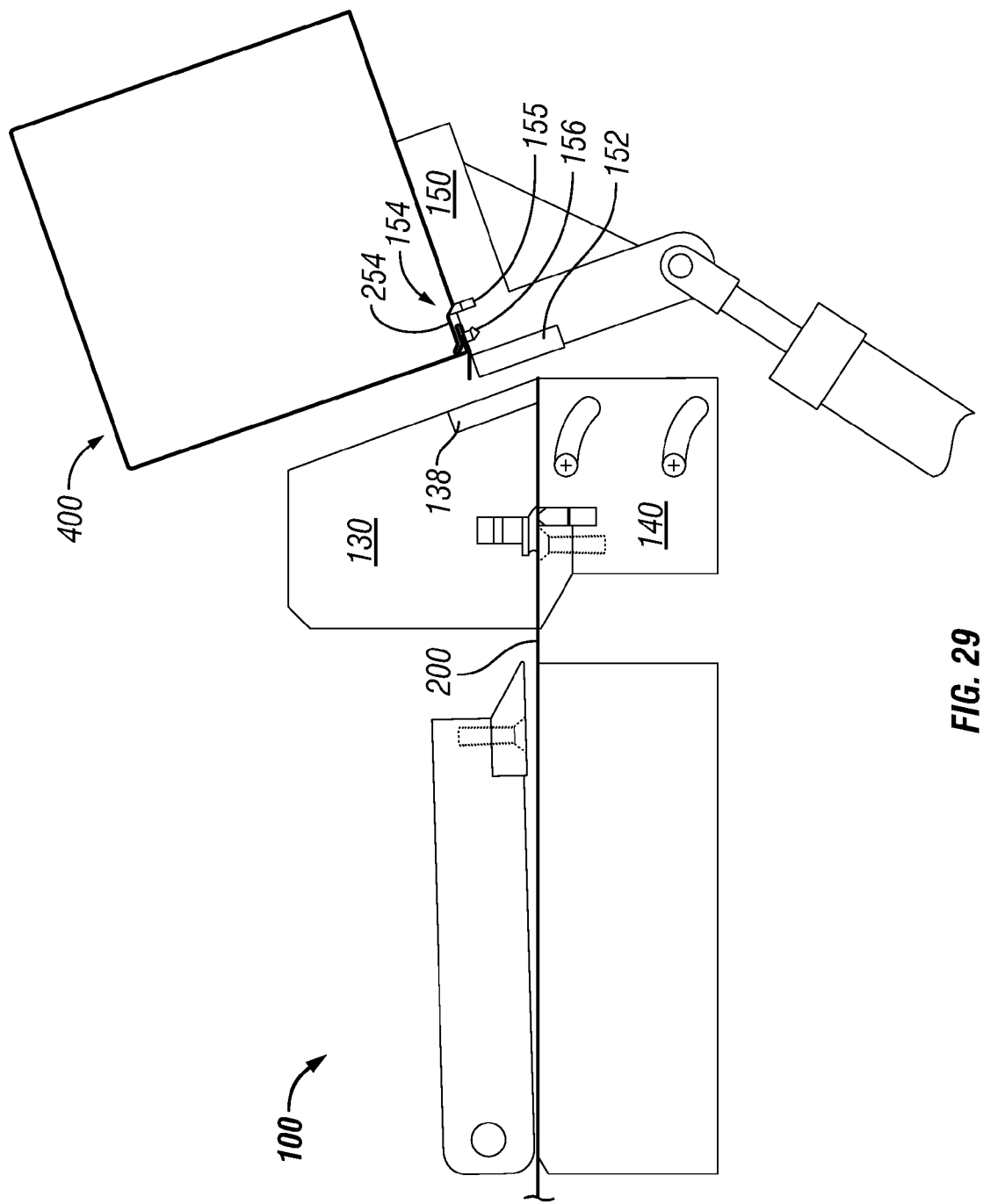
Figure 30:
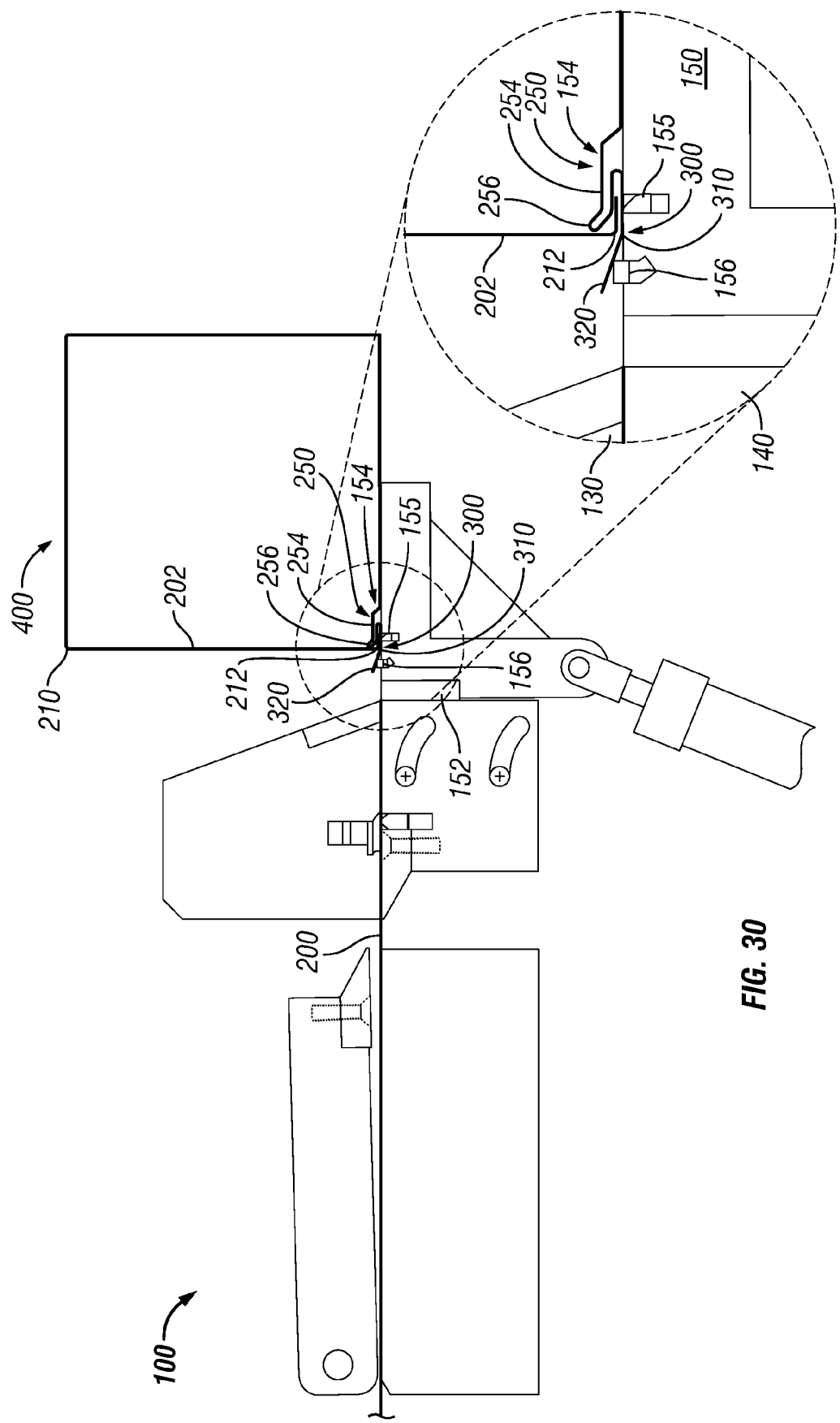

Referring to FIG. 29, the clamp beam 130 again clamps the metal web 200 against the table 140. The first shear blade 138 and the second shear blade 152 shear the metal web 200 rearward of the pre-bend 310 to form the clinch tab 320, as shown in FIG. 30, thereby also separating the duct blank 400 from the metal web 200. The approximately twenty (20) degree pre-bend 310 causes the clinch tab 320 to retain the lock tab 212 together with the Z-fold 250, while continued engagement of the retractable rib 155 into the inward offset 254 holds the duct blank 400 to the leaf 150.

Referring to FIG. 31, the retractable roller assembly 156 is extended from the leaf 150 and is rolled along the outside of the clinch tab 320 to firmly clinch the clinch tab 320 against the first segment 202 of the duct blank 400, thereby clinching the lock seam 300 to complete the duct blank 400.

One of ordinary skill will appreciate that the apparatus 100, as used in the embodiment of FIGS. 1-31, provides an advantage over the prior art by automating the previously offline steps of closing/aligning the lock seam 300 and clinching the lock seam 300, providing an ease of manufacture presently unknown in the art. The embodiment of FIGS. 1-31 is particularly intended for use in the larger machine shown in FIGS. 32-33.

As a particular advantage of the present invention, the insertion angle 256 enables automated insertion of the lock tab 212 into the Z-fold 250 with improved reliability. Additionally, the inward offset 254 enables forming the insertion angle 256 while maintaining a substantially smooth closing segment 208 of the duct blank 400 near the lock seam 300. The pre-bend 310 and the clinch tab 320 enable shearing-off of the duct blank 400 from the metal web 200 without concern for the lock tab 212 springing out from the Z-fold 250. As yet a further advantage of the present invention, the inward offset 254 enhances ease of closure of the lock seam 300 by providing a substantially smooth closing segment 208 that enhances uniformity of a bending force exerted on the pre-bend 310 through the Z-fold 250. In particular, the inward offset 254 and the pre-bend 310 enable clinching the clinch tab 320 to a position substantially flat against the first segment 202, providing an attractive smooth appearance to the duct blank 400 and also enhancing safety of handling the duct blank 400. Additionally, use of the retractable roller assembly 156 makes it possible to clinch the clinch tab 320 with relatively little forward force, thereby enabling the duct blank 400 to be held in place by engagement of the retractable rib 155 into the inward offset 254 during clinching.

While many advantages of the present invention can be clearly seen from the embodiment described, it will be understood that the present invention is not limited to such embodiments. Those skilled in the art will appreciate that many alterations and variations are possible within the scope of the present invention.

For example, the metal web 200 may be entirely flat, or may be formed with notched flanges along each lateral edge. In another embodiment (not shown), the sealant injector 180 may deposit the sealant bead 187 along an inside corner of the bend 210 prior to advancing the metal web 200 for insertion of the bend 210 into the insertion angle 256. Also, by varying the profile of the clamp beam 130 and the motion of the leaf 150, a pre-bend 310 of more or less than twenty (20) degrees may be achieved. Furthermore, with provision of suitable means for heating and cooling the first shear blade 138 and the second shear blade 152, the apparatus 100 may be used for making ducts from thermoplastic stock rather than from a metal web. Alternatively, the controller 101 can be programmed to direct motion of the leaf 150 for forming corner angles of other than ninety (90) degrees, so as to form duct blanks having profiles with more or less than four segments. Dimensions of the clamp beam 130 may require adjustment to accommodate changes to the duct blank profile.

What is claimed is:
1. An apparatus for in-line manufacturing of duct blanks from a metal web, comprising:
   a lower platen;
   an upper platen vertically and pivotally movable toward and away from the lower platen;
   a table horizontally and vertically movable toward and away from the lower platen, the table including a lower insert movable between a retracted position fully housed within the table and a fully extended position protruding above the table;
   a clamp beam horizontally movable with the table and vertically movable toward and away from the table, the clamp beam including a groove extending across the lateral width of the clamp beam in horizontal alignment with the lower insert of the table such that, in the fully extended position, the lower insert is inserted into the groove; and a leaf horizontally movable with the table and pivotally and vertically movable relative to the table, the leaf including a clinching tool; and a controller operatively connected to control the movements of the upper platen, the table, the clamp beam, and the leaf.

2. An apparatus for in-line manufacturing of duct blanks from a metal web, comprising:

a lower platen;

an upper platen vertically and pivotally movable toward and away from the lower platen;

a table horizontally and vertically movable toward and away from the lower platen, the table including a lower insert movable between a retracted position fully housed within the table and a fully extended position protruding above the table;

a clamp beam horizontally movable with the table and vertically movable toward and away from the table, the clamp beam including a groove extending across the lateral width of the clamp beam in horizontal alignment with the lower insert of the table such that, in the fully extended position, the lower insert is inserted into the groove;

a leaf horizontally movable with the table and pivotally and vertically movable relative to the table, the leaf including a clinching tool; and a controller operatively connected to the upper platen, the table, the clamp beam, and the leaf, the controller being configured to move the upper platen, the clamp beam, the table, the lower insert, the leaf, and the clinching tool to feed said metal web in a forward direction from the lower platen toward the table, to repeatedly bend said metal web to form a duct blank having a lock tab at a forward end of the duct blank and having a Z-fold at a rearward end of the duct blank, to indent an inward offset into the duct blank forward of the Z-fold, to bend the duct blank at a plurality of corners to form a duct blank having a lock tab inserted into the Z-fold, to shear said metal web rearward of the Z-fold so as to form a clinch tab, and to engage the inward offset while clinching the clinch tab against the lock tab, thereby clinching a lock seam to close the duct blank.

3. The apparatus according to claim 2, further comprising:
a sealant injector laterally movable along said clamp beam, wherein said controller is further configured to move and to actuate the sealant injector for depositing a bead of sealant into said Z-fold before insertion of said lock tab into said Z-fold.

4. The apparatus according to claim 2, said clamp beam further including an upper insert disposed in horizontal alignment with said groove and vertically movable within said clamp beam between an upwardly retracted position where the upper insert does not extend into said groove and a downwardly extended position where the upper insert does extend into said groove, said groove further including a pocket disposed at a rearward side of said groove.

5. The apparatus according to claim 4, wherein said controller is further configured to form an insertion angle in said Z-fold by extending said upper insert while a rearward portion of said Z-fold is held in said pocket.

6. The apparatus according to claim 2, further comprising:
a gripper movably mounted to said clamp beam for selectively holding a segment of said duct blank,
wherein said controller is further configured to move and to actuate the gripper for inserting said lock tab into said Z-fold to form said lock seam.

7. The apparatus according to claim 6, wherein said gripper is movable forward and rearward relative to said clamp beam.

8. The apparatus according to claim 2, wherein said clinching tool includes a retractable rib movable from a position housed within said leaf to a position protruding above an upper working surface of said leaf, and said clinching tool also includes a retractable roller assembly pivotally movable from a position recessed within said leaf to a position extended above the upper working surface of said leaf, the retractable roller assembly and the retractable rib being disposed so as to define a space therebetween for receiving said Z-fold and said clinch tab, the retractable roller assembly being laterally movable across said leaf substantially parallel to the retractable rib.

9. The apparatus according to claim 8, wherein said controller is further configured to extend the retractable rib so as to engage said inward offset and to pivotally extend the retractable roller assembly and to laterally move the retractable roller assembly along the retractable rib so as to clinch said clinch tab against said duct blank, thereby clinching said lock seam.

10. The apparatus according to claim 2, wherein said controller is further configured to move the leaf to form a pre-bend rearward of the Z-fold.

11. The apparatus according to claim 1, further comprising:
a gripper movably mounted to said clamp beam for selectively holding a segment of said duct blank.

12. The apparatus according to claim 11, wherein said gripper is movable forward and rearward relative to said clamp beam.

13. The apparatus according to claim 1, further comprising:
a sealant injector laterally movable along the clamp beam.

14. The apparatus according to claim 1, said clamp beam further including an upper insert disposed in horizontal alignment with said groove and vertically movable within said clamp beam between an upwardly retracted position where the upper insert does not extend into said groove and a downwardly extended position where the upper insert does extend into said groove, said groove further including a pocket disposed at a rearward side of said groove.

15. The apparatus according to claim 1, wherein said clinching tool includes a retractable rib movable from a position housed within said leaf to a position protruding above an upper working surface of said leaf, and said clinching tool also includes a retractable roller assembly pivotally movable from a position recessed within said leaf to a position extended above said leaf upper working surface, the retractable roller assembly and the retractable rib being disposed so as to define a space therebetween for receiving said Z-fold and said clinch tab, the retractable roller assembly being laterally movable across said leaf substantially parallel to the retractable rib.

* * * * *